(12) United States Patent
Mu

(10) Patent No.: US 11,777,659 B2
(45) Date of Patent: Oct. 3, 2023

(54) HYBRID AUTOMATIC REPEAT REQUEST (HARQ) FEEDBACK METHOD AND APPARATUS

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 499 days.

(21) Appl. No.: 17/266,087

(22) PCT Filed: Aug. 8, 2018

(86) PCT No.: PCT/CN2018/099453
§ 371 (c)(1),
(2) Date: Feb. 4, 2021

(87) PCT Pub. No.: WO2020/029132
PCT Pub. Date: Feb. 13, 2020

(65) Prior Publication Data
US 2021/0314093 A1 Oct. 7, 2021

(51) Int. Cl.
*H04L 1/1812* (2023.01)
*H04L 1/1607* (2023.01)
(Continued)

(52) U.S. Cl.
CPC .......... *H04L 1/1812* (2013.01); *H04L 1/1621* (2013.01); *H04W 72/21* (2023.01); *H04W 72/23* (2023.01)

(58) Field of Classification Search
CPC .... H04L 1/1812; H04L 1/1621; H04W 72/21; H04W 72/23
See application file for complete search history.

(56) References Cited

U.S. PATENT DOCUMENTS

2008/0049821 A1* 2/2008 Murao ................ H04L 1/0003
375/227
2012/0327885 A1 12/2012 Chung et al.
(Continued)

FOREIGN PATENT DOCUMENTS

CN 101345608 A 1/2009
CN 101442818 A 5/2009
(Continued)

OTHER PUBLICATIONS

European Patent Office, Extended European Search Report Issued in Application No. 18929296.4, dated Jul. 14, 2021, Germany, 8 pages.
(Continued)

*Primary Examiner* — Duc C Ho
(74) *Attorney, Agent, or Firm* — SYNCODA LLC; Feng Ma

(57) ABSTRACT

A hybrid automatic repeat request (HARQ) feedback method includes: determining a plurality of target HARQ results; where the plurality of target HARQ results correspond to a plurality of respective target physical downlink shared channels (PDSCHs) which are scheduled by a current physical downlink control channel (PDCCH); determining a combined HARQ result based on the plurality of target HARQ results; where the combined HARQ result is configured to represent the plurality of target HARQ results; determining one target physical uplink control channel (PUCCH); where the target PUCCH includes a target resource carrying the combined HARQ result; and sending the target PUCCH that includes the target resource carrying the combined HARQ result to a base station. A plurality of target HARQ results can be represented by one combined HARQ result to improve HARQ feedback efficiency and reduce PUCCH resource cost.

20 Claims, 18 Drawing Sheets

Convert the plurality of target HARQ results into the respective binary values in accordance with a preset correspondence between HARQ results and binary values — 102-11

Perform the logical AND operation on the respective binary values for the plurality of target HARQ results, and take a result of the operation as the combined HARQ result — 102-12

(51) Int. Cl.
*H04W 72/21* (2023.01)
*H04W 72/23* (2023.01)

(56) References Cited

U.S. PATENT DOCUMENTS

| | | | |
|---|---|---|---|
| 2013/0176920 A1 | 7/2013 | Seo et al. | |
| 2014/0169242 A1 | 6/2014 | Yang et al. | |
| 2014/0226581 A1 | 8/2014 | Nam et al. | |
| 2014/0233541 A1 | 8/2014 | Kim et al. | |
| 2015/0085714 A1 | 3/2015 | Liang et al. | |
| 2015/0189646 A1 | 7/2015 | Chung et al. | |
| 2016/0182207 A1 | 6/2016 | Chung et al. | |
| 2017/0126386 A1 | 5/2017 | Chung et al. | |
| 2017/0289995 A1 | 10/2017 | Lin et al. | |
| 2022/0330381 A1* | 10/2022 | Xiong | H04W 88/06 |

FOREIGN PATENT DOCUMENTS

| | | |
|---|---|---|
| CN | 102835057 A | 12/2012 |
| CN | 103109484 A | 5/2013 |
| CN | 103891182 A | 6/2014 |
| CN | 104919743 A | 9/2015 |
| CN | 107277923 A | 10/2017 |
| EP | 2385738 A1 | 11/2011 |

OTHER PUBLICATIONS

ISA State Intellectual Property Office of the People's Republic of China, Written Opinion of the International Searching Authority Issued in Application No. PCT/CN2018/099453, dated Apr. 30, 2019, WIPO, 8 pages.

State Intellectual Property Office of the People's Republic of China, Office Action and Search Report Issued in Application No. 201880001767.2, dated May 18, 2021, 22 pages.

State Intellectual Property Office of the People's Republic of China, Office Action and Search Report Issued in Application No. 2018800017672, dated Sep. 30, 2020, 23 pages, (Submitted with Machine Translation).

ISA State Intellectual Property Office of the People's Republic of China, International Search Report Issued in Application No. PCT/CN2018/099453, dated Apr. 30, 2019, WIPO, 4 pages.

Intellectual property India, Office Action Issued in Application No. 202147008791, dated Jan. 24, 2022, 6 pages.

* cited by examiner

HYBRID AUTOMATIC REPEAT REQUEST (HARQ) FEEDBACK METHOD AND APPARATUS

CROSS-REFERENCE TO RELATED APPLICATION

This application is a national stage of International Application No. PCT/CN2018/099453 filed on Aug. 8, 2018, the disclosure of which is hereby incorporated by reference in its entirety.

TECHNICAL FIELD

The present disclosure relates to the field of communications, and in particular, relates to hybrid automatic repeat request (HARQ) feedback methods and apparatuses.

BACKGROUND

In recent years, Internet of Things grows rapidly and brings many conveniences to our life and works. Particularly, a Machine Type Communication (MTC) technology is a typical representative of a cellular Internet of Things technology.

A basic framework of the MTC is formed in Release 13 of Long Term Evolution (LTE). In the MTC, one physical downlink control channel (PDCCH) schedules one physical downlink shared channel (PDSCH) or one physical uplink shared channel (PUSCH), and an MTC device has to receive and blindly detect the PDCCH before receiving or transmitting data, which is similar to scheduling in a traditional LTE. Therefore, the MTC device has to perform scheduling for several rounds to achieve transmitting or receiving a large data packet, and in most cases, these PDCCH scheduling operations are of similar content due to similar channel conditions. Even in such cases, a user has still to demodulate the PDCCH per scheduling, which consumes power.

In order to avoid power consumption in the above cases, it is proposed in Release 16 of the 3rd Generation Partnership Project (3GPP) that, in an MTC system, a plurality of PDSCHs can be continuously scheduled by one PDCCH.

In the current MTC system, however, a hybrid automatic repeat request (HARQ) feedback mechanism is still the same as that in the traditional LTE. That is, for each PDSCH, one physical uplink control channel (PUCCH) is called to feed back its HARQ result, as illustrated in FIG. 1. Thereby, too many PUCCH resources are consumed, and feedback time of the device is delayed, which are harmful to power saving.

SUMMARY

In order to overcome the problems in the related arts, embodiments of the present disclosure provide HARQ feedback methods and apparatuses.

According to a first aspect of the embodiments of the present disclosure, an HARQ feedback method, being applicable to an MTC device, includes:
determining a plurality of target HARQ results; where the plurality of target HARQ results correspond to a plurality of respective target PDSCHs which are scheduled by a current PDCCH;
determining a combined HARQ result based on the plurality of target HARQ results; where the combined HARQ result is configured to represent the plurality of target HARQ results;
determining one target PUCCH; where the target PUCCH includes a target resource carrying the combined HARQ result; and
sending the target PUCCH that includes the target resource carrying the combined HARQ result to a base station.

In some embodiments, determining the combined HARQ result based on the plurality of target HARQ results includes:
converting the plurality of target HARQ results into respective binary values in accordance with a preset correspondence between HARQ results and binary values;
performing a logical AND operation on the respective binary values for the plurality of target HARQ results, and taking a result of the operation as the combined HARQ result.

In some embodiments, determining the combined HARQ result based on the plurality of target HARQ results includes:
converting the plurality of target HARQ results into respective binary values in accordance with a preset correspondence between HARQ results and binary values;
grouping the plurality of target HARQ results into a plurality of HARQ groups;
for each of the HARQ groups, performing a logical AND operation on the respective binary values for the target HARQ results included in the HARQ group, and taking a result of the operation as the combined HARQ result of the current HARQ group.

In some embodiments, determining the combined HARQ result based on the plurality of target HARQ results includes:
sorting the plurality of target HARQ results in sequence and performing channel coding, scrambling and modulation in turn to obtain the combined HARQ result.

In some embodiments, determining the one target PUCCH includes:
determining a target index value of the target resource; and
taking a PUCCH indicated by the target index value as the target PUCCH.

In some embodiments, determining the target index value of the target resource includes:
determining the target index value based on a value corresponding to a target starting position, a target control channel element (CCE) index value of a search space, and a first target offset;
where the target starting position is configured by a higher-layer signaling and indicates a starting position of a PUCCH resource carrying an HARQ result, the target CCE index value indicates a minimum CCE index value of the current PDCCH, and the first target offset is carried by the current PDCCH and indicates an offset of a PUCCH resource for HARQ result feedback.

In some embodiments, determining the one target PUCCH includes:
receiving a PUCCH set sent by the base station through a first target signaling, where the PUCCH set includes a plurality of candidate PUCCHs;
receiving a second target signaling sent by the base station, where the second target signaling carries resource indicating information for indicating the target resource; and taking, based on the resource indicating information, a candidate PUCCH corresponding to the target resource from the PUCCH set as the target PUCCH.

In some embodiments, sending the target PUCCH that includes the target resource carrying the combined HARQ result to the base station includes:
making the combined HARQ result carried by the target resource; and sending the target PUCCH to the base station in a preset PUCCH format.

In some embodiments, the method further includes:
determining a target feedback time point; and
where sending the target PUCCH that includes the target resource carrying the combined HARQ result to the base station includes:
in response to reaching the target feedback time point, sending the target PUCCH that includes the target resource carrying the combined HARQ result to the base station.

In some embodiments, determining the target feedback time point includes:
determining a target subframe; where the target subframe is a first one of valid subframes which are spaced from a candidate subframe by a preset number of subframes, and the candidate subframe is a subframe in which a last one of the plurality of PDSCHs scheduled by the current PDCCH locates; and
taking a time point to send the target subframe as the target feedback time point.

According to a second aspect of the embodiments of the present disclosure, an HARQ feedback method, being applicable to an MTC device, includes:
determining a plurality of target HARQ results; where the plurality of target HARQ results correspond to a plurality of respective target PDSCHs which are scheduled by a current PDCCH;
determining, based on the plurality of target HARQ results, one target PUCCH from a plurality of candidate PUCCHs and a combined HARQ result; where the target PUCCH includes a target resource carrying the combined HARQ result, and the combined HARQ result and the target resource are configured to represent the plurality of target HARQ results; and
sending the target PUCCH that includes the target resource carrying the combined HARQ result to a base station.

In some embodiments, the plurality of candidate PUCCHs are determined by:
determining a first index value, where the first index value is a resource index value of a first one of the plurality of candidate PUCCHs;
taking a PUCCH indicated by the first index value as the first candidate PUCCH;
determining a second index value based on the first index value and a second target offset; where the second target offset is pre-configured to indicate an offset of a PUCCH resource of other candidate PUCCH, and said other candidate PUCCH is a candidate PUCCH other than the first candidate PUCCH; and
taking a PUCCH indicated by the second index value as said other candidate PUCCH.

In some embodiments, determining the first index value includes:
determining the first index value based on a value corresponding to a target starting position, a target CCE index value of a search space, and a first target offset; where the target starting position is configured by a higher-layer signaling and indicates a starting position of a PUCCH resource carrying an HARQ result, the target CCE index value indicates a minimum CCE index value of the current PDCCH, and the first target offset is carried by the current PDCCH and indicates an offset of a PUCCH resource for HARQ result feedback.

In some embodiments, determining, based on the plurality of target HARQ results, the one target PUCCH from the plurality of candidate PUCCHs and the combined HARQ result includes:
determining, based on a preset mapping relationship among target HARQ results, target resources and combined HARQ results, the one target PUCCH from the plurality of candidate PUCCHs and the combined HARQ result.

In some embodiments, the method further includes:
in response to that a total number of the plurality of target HARQ results is greater than a preset number, grouping the plurality of target HARQ results into a plurality of HARQ groups;
for each of the HARQ groups, determining a pre-processed HARQ result of the HARQ group based on all the target HARQ results included in the HARQ group;
determining, based on a plurality of pre-processed HARQ results, one target PUCCH from the plurality of candidate PUCCHs and a combined pre-processed HARQ result; where the target PUCCH includes the target resource carrying the combined pre-processed HARQ result, and the combined pre-processed HARQ result and the target resource are configured to represent the plurality of pre-processed HARQ results; and
sending the target PUCCH that includes the target resource carrying the combined pre-processed HARQ result to the base station.

In some embodiments, the method further includes:
determining a target feedback time point; and
where sending the target PUCCH that includes the target resource carrying the combined HARQ result to the base station includes:
in response to reaching the target feedback time point, sending the target PUCCH that includes the target resource carrying the combined HARQ result to the base station.

In some embodiments, determining the target feedback time point includes:
determining a target subframe; where the target subframe is a first one of valid subframes which are spaced from a candidate subframe by a preset number of subframes, and the candidate subframe is a subframe in which a last one of the plurality of PDSCHs scheduled by the current PDCCH locates; and
taking a time point to send the target subframe as the target feedback time point.

According to a third aspect of the embodiments of the present disclosure, an HARQ feedback apparatus, being applicable to an MTC device, includes:
a first determining module, configured to determine a plurality of target HARQ results; where the plurality of target HARQ results correspond to a plurality of respective target PDSCHs which are scheduled by a current PDCCH;
a second determining module, configured to determine a combined HARQ result based on the plurality of target HARQ results; where the combined HARQ result is configured to represent the plurality of target HARQ results;

a channel determining module, configured to determine one target PUCCH; where the target PUCCH includes a target resource carrying the combined HARQ result; and a first sending module, configured to send the target PUCCH that includes the target resource carrying the combined HARQ result to a base station.

In some embodiments, the second determining module includes:

a first converting submodule, configured to convert the plurality of target HARQ results into respective binary values in accordance with a preset correspondence between HARQ results and binary values; and a first determining submodule, configured to perform a logical AND operation on the respective binary values for the plurality of target HARQ results, and take a result of the operation as the combined HARQ result.

In some embodiments, the second determining module includes:

a second converting submodule, configured to convert the plurality of target HARQ results into respective binary values in accordance with a preset correspondence between HARQ results and binary values;

a grouping submodule, configured to group the plurality of target HARQ results into a plurality of HARQ groups; and a second determining submodule, configured to for each of the HARQ groups, perform a logical AND operation on the respective binary values for the target HARQ results included in the HARQ group, and take a result of the operation as the combined HARQ result of the current HARQ group.

In some embodiments, the second determining module includes:

a third determining submodule, configured to sort the plurality of target HARQ results in sequence and perform channel coding, scrambling and modulation in turn to obtain the combined HARQ result.

In some embodiments, the channel determining module includes:

a target index value determining submodule, configured to determine a target index value of the target resource; and a first channel determining submodule, configured to take a PUCCH indicated by the target index value as the target PUCCH.

In some embodiments, the target index value determining submodule includes:

a first index value determining unit, configured to determine the target index value based on a value corresponding to a target starting position, a target CCE index value of a search space, and a first target offset; where the target starting position is configured by a higher-layer signaling and indicates a starting position of a PUCCH resource carrying an HARQ result, the target CCE index value indicates a minimum CCE index value of the current PDCCH, and the first target offset is carried by the current PDCCH and indicates an offset of a PUCCH resource for HARQ result feedback.

In some embodiments, the channel determining module includes:

a first receiving submodule, configured to receive a PUCCH set sent by the base station through a first target signaling, where the PUCCH set includes a plurality of candidate PUCCHs;

a second receiving submodule, configured to receive a second target signaling sent by the base station, where the second target signaling carries resource indicating information for indicating the target resource; and a second channel determining submodule, configured to take, based on the resource indicating information, a candidate PUCCH corresponding to the target resource from the PUCCH set as the target PUCCH.

In some embodiments, the first sending module includes:

a first sending submodule, configured to make the combined HARQ result carried by the target resource; and send the target PUCCH to the base station in a preset PUCCH format.

In some embodiments, the apparatus further includes:

a first feedback time determining module, configured to determine a target feedback time point; and where the first sending module includes:

a second sending submodule, configured to send the target PUCCH that includes the target resource carrying the combined HARQ result to the base station in response to reaching the target feedback time point.

In some embodiments, the first feedback time determining module includes:

a first subframe determining submodule, configured to determine a target subframe; where the target subframe is a first one of valid subframes which are spaced from a candidate subframe by a preset number of subframes, and the candidate subframe is a subframe in which a last one of the plurality of PDSCHs scheduled by the current PDCCH locates; and a first feedback time determining submodule, configured to take a time point to send the target subframe as the target feedback time point.

According to a fourth aspect of the embodiments of the present disclosure, an HARQ feedback apparatus, being applicable to an MTC device, includes:

a third determining module, configured to determine a plurality of target HARQ results; where the plurality of target HARQ results correspond to a plurality of respective target PDSCHs which are scheduled by a current PDCCH;

a fourth determining module, configured to determine, based on the plurality of target HARQ results, one target PUCCH from a plurality of candidate PUCCHs and a combined HARQ result; where the target PUCCH includes a target resource carrying the combined HARQ result, and the combined HARQ result and the target resource are configured to represent the plurality of target HARQ results; and a second sending module, configured to send the target PUCCH that includes the target resource carrying the combined HARQ result to a base station.

In some embodiments, the fourth determining module includes:

a first index value determining submodule, configured to determine a first index value, where the first index value is a resource index value of a first one of the plurality of candidate PUCCHs;

a second channel determining submodule, configured to take a PUCCH indicated by the first index value as the first candidate PUCCH;

a second index value determining submodule, configured to determine a second index value based on the first index value and a second target offset; where the second target offset is pre-configured to indicate an offset of a PUCCH resource of other candidate PUCCH, and said other candidate PUCCH is a candidate PUCCH other than the first candidate PUCCH; and a third channel determining submodule, configured to take a PUCCH indicated by the second index value as said other candidate PUCCH.

In some embodiments, the first index value determining submodule includes:

a second index value determining unit, configured to determine the first index value based on a value corresponding to a target starting position, a target CCE index value of a search space, and a first target offset;

where the target starting position is configured by a higher-layer signaling and indicates a starting position of a PUCCHs resource carrying an HARQ result, the target CCE index value indicates a minimum CCE index value of the current PDCCH, and the first target offset is carried by the current PDCCH and indicates an offset of a PUCCH resource for HARQ result feedback.

In some embodiments, the fourth determining module includes:

a fourth determining submodule, configured to determine, based on a preset mapping relationship among target HARQ results, target resources and combined HARQ results, the one target PUCCH from the plurality of candidate PUCCHs and the combined HARQ result.

In some embodiments, the apparatus further includes:

a grouping module, configured to group the plurality of target HARQ results into a plurality of HARQ groups in response to that a total number of the plurality of target HARQ results is greater than a preset number;

a pre-processed result determining module, configured to for each of the HARQ groups, determine a pre-processed HARQ result of the HARQ group based on all the target HARQ results included in the HARQ group;

a fifth determining module, configured to determine, based on a plurality of pre-processed HARQ results, one target PUCCH from the plurality of candidate PUCCHs and a combined pre-processed HARQ result; where the target PUCCH includes the target resource carrying the combined pre-processed HARQ result, and the combined pre-processed HARQ result and the target resource are configured to represent the plurality of pre-processed HARQ results; and a third sending module, configured to send the target PUCCH that includes the target resource carrying the combined pre-processed HARQ result to the base station.

In some embodiments, the apparatus further includes:

a second feedback time determining module, configured to determine a target feedback time point;

where the second sending module includes:

a third sending submodule, configured to send the target PUCCH that includes the target resource carrying the combined HARQ result to the base station in response to reaching the target feedback time point.

In some embodiments, the second feedback time determining module includes:

a second subframe determining submodule, configured to determine a target subframe; where the target subframe is a first one of valid subframes which are spaced from a candidate subframe by a preset number of subframes, and the candidate subframe is a subframe in which a last one of the plurality of PDSCHs scheduled by the current PDCCH locates; and a second feedback time determining submodule, configured to take a time point to send the target subframe as the target feedback time point.

According to a fifth aspect of the embodiments of the present disclosure, a computer-readable storage medium is provided. The storage medium stores a computer program that is configured to perform the HARQ feedback method according to the forgoing first aspect.

According to a sixth aspect of the embodiments of the present disclosure, a computer-readable storage medium is provided. The storage medium stores a computer program that is configured to perform the HARQ feedback method according to the forgoing second aspect.

According to a seventh aspect of the embodiments of the present disclosure, an HARQ feedback apparatus, being applicable to an MTC device, includes:

a processor; and memory for storing instructions executable by the processor;

where the processor is configured to:

determine a plurality of target HARQ results; where the plurality of target HARQ results correspond to a plurality of respective target PDSCHs which are scheduled by a current PDCCH;

determine a combined HARQ result based on the plurality of target HARQ results; where the combined HARQ result is configured to represent the plurality of target HARQ results;

determine one target PUCCH; where the target PUCCH includes a target resource carrying the combined HARQ result; and send the target PUCCH that includes the target resource carrying the combined HARQ result to a base station.

According to an eighth aspect of the embodiments of the present disclosure, an HARQ feedback apparatus, being applicable to an MTC device, includes:

a processor; and memory for storing instructions executable by the processor;

where the processor is configured to:

determine a plurality of target HARQ results; where the plurality of target HARQ results correspond to a plurality of respective target PDSCHs which are scheduled by a current PDCCH;

determine, based on the plurality of target HARQ results, one target PUCCH from a plurality of candidate PUCCHs and a combined HARQ result; where the target PUCCH includes a target resource carrying the combined HARQ result, and the combined HARQ result and the target resource are configured to represent the plurality of target HARQ results; and send the target PUCCH that includes the target resource carrying the combined HARQ result to a base station.

The technical solutions provided according to the embodiments of the present disclosure may obtain the following beneficial effects.

In some embodiments of the present disclosure, an MTC device may determine a plurality of target HARQ results firstly, where the plurality of target HARQ results correspond to a plurality of respective target PDSCHs which are scheduled by a current PDCCH. Further, the MTC device may determine a combined HARQ result based on the plurality of target HARQ results, and the plurality of target HARQ results may be represented directly by the combined HARQ result in some embodiments of the present disclosure. Then, the MTC device makes the combined HARQ result carried by a target resource of a target PUCCH and sends the target PUCCH to a base station. Through the above process, the plurality of target HARQ results can be represented by one combined HARQ result, so that HARQ feedback efficiency in an MTC system can be improved and cost of PUCCH resource can be reduced, which facilitate power saving for the MTC device.

In some embodiments of the present disclosure, an MTC device may convert a plurality of target HARQ results into respective binary values in accordance with a preset correspondence between HARQ results and binary values, further perform a logical AND operation on the respective binary values for the plurality of target HARQ results, and finally take a result of the operation as a combined HARQ result, so that a purpose that the plurality of target HARQ results are represented by the combined HARQ result can be implemented, which is highly available.

In some embodiments of the present disclosure, a plurality of target HARQ results may be grouped if their number is large, and for each of the HARQ groups, a logical AND operation may be performed on respective binary values for the target HARQ results included in the HARQ group, and then a result of the operation may be taken as a combined HARQ result of the current HARQ group. Therefore, in some embodiments of the present disclosure, the plurality of target HARQ results can be grouped, so as to determine the combined HARQ result of each HARQ group, which is highly available.

In some embodiments of the present disclosure, an MTC device may directly sort a plurality of target HARQ results in sequence, perform channel coding, scrambling and modulation in turn, and thereby obtain a combined HARQ result. Through the above embodiments, each of the plurality of target HARQ results can be accurately reported, so that the reported result can be rather accurate. Also, HARQ feedback efficiency in an MTC system can be improved and cost of PUCCH resource can be reduced, which facilitate power saving for the MTC device.

In some embodiments of the present disclosure, during determining one target PUCCH, an MTC device may determine a target index value of a target resource firstly, and then take a PUCCH indicated by the target index value as the target PUCCH. In some embodiments, the target index value may be determined based on a value corresponding to a target starting position, a target CCE index value of a search space and a first target offset. Through the above process, the target PUCCH can be quickly determined by the MTC device, which is convenient to subsequently carry a combined HARQ result through the target resource of the target PUCCH.

In some embodiments of the present disclosure, an MTC device may also receive a PUCCH set sent by a base station through a first target signaling, where the PUCCH set includes a plurality of candidate PUCCHs. Further, the MTC device may receive a second target signaling that is sent by the base station and carries resource indicating information for indicating a target resource, and thus may determine a target PUCCH from the PUCCH set based on the resource indicating information. Through the above process, the MTC device can quickly determine the target PUCCH based on the signaling sent by the base station, which is simple to be implemented and is highly available.

In some embodiments of the present disclosure, an MTC device may send a target PUCCH that includes a target resource carrying a combined HARQ result to a base station. In this case, in some embodiments, the target PUCCH may be sent in a preset PUCCH format, which is simple to be implemented and improves HARQ feedback efficiency in an MTC system.

In some embodiments of the present disclosure, an MTC device may determine a target feedback time point, and it may not be performed until the target feedback time point that the MTC device sends a target PUCCH that includes a target resource carrying a combined HARQ result to a base station. Through the above process, it is possible to report a plurality of target HARQ results to the base station together after a last one of a plurality of PDSCHs scheduled by a current PDCCH has been scheduled, so that HARQ feedback efficiency in an MTC system can be improved and cost of PUCCH resource can be reduced, which facilitate power saving for the MTC device.

In some embodiments of the present disclosure, an MTC device may take a first one of valid subframes which are spaced from a candidate subframe by a preset number of subframes as a target subframe, where the candidate subframe is a subframe in which a last one of a plurality of PDSCHs scheduled by a current PDCCH locates. Further, the MTC device may take a time point to send the target subframe as a target feedback time point for feeding back a plurality of target HARQ results. Through the above process, it is possible to report the plurality of target HARQ results to a base station together after the last one of the plurality of PDSCHs scheduled by the current PDCCH has been scheduled, so that HARQ feedback efficiency in an MTC system can be improved and cost of PUCCH resource can be reduced, which facilitate power saving for the MTC device.

In some embodiments of the present disclosure, alternatively, an MTC device may firstly determine a plurality of target HARQ results, where the plurality of target HARQ results correspond to a plurality of respective target PDSCHs which are scheduled by a current PDCCH. Then, the MTC device may determine, based on the plurality of target HARQ results, one target PUCCH from a plurality of candidate PUCCHs and a combined HARQ result. In some embodiments of the present disclosure, the target PUCCH includes a target resource carrying the combined HARQ result, and the plurality of target HARQ results may be represent by both the combined HARQ result and the target resource. The MTC device may send the target PUCCH that includes the target resource carrying the combined HARQ result to a base station. In the above embodiments, such a purpose can be achieved that the plurality of target HARQ results are represented by both the combined HARQ result and the target resource of the target PUCCH, so that the target resource can be saved and HARQ feedback efficiency in an MTC system can be improved, which facilitate power saving for the MTC device.

In some embodiments of the present disclosure, during determining a plurality of candidate PUCCHs, an MTC device may firstly determine a first index value that indicates a first one of the plurality of candidate PUCCHs, and then determine a second index value and take a PUCCH indicated by the second index value as other candidate PUCCH. Through the above process, the MTC device can determine the plurality of candidate PUCCHs and subsequently select one of the plurality of candidate PUCCHs as a target PUCCH, which is highly available.

In some embodiments of the present disclosure, an MTC device may determine one target PUCCH from a plurality of candidate PUCCHs and a combined HARQ result based on a preset mapping relationship among target HARQ results, target resources and combined HARQ results. Thus, the MTC device can represent a candidate target HARQ result through the target PUCCH while represent the other target HARQ results through the combined HARQ result, so that such a purpose can be achieved that a plurality of target HARQ results are represented by both the combined HARQ result and a target resource of the target PUCCH, which further saves the target resource.

In some embodiments of the present disclosure, it is optional to group a plurality of target HARQ results into a plurality of HARQ groups if a total number of the plurality of target HARQ results is greater than a preset number. Then, for each of the HARQ groups, a pre-processed HARQ result of the HARQ group may be determined based on all the target HARQ results included in the HARQ group. In some embodiments of the present disclosure, one target PUCCH from a plurality of candidate PUCCHs and a combined pre-processed HARQ result may be determined based on a plurality of pre-processed HARQ results, and then the target PUCCH that includes a target resource carrying the combined pre-processed HARQ result may be sent to a base station. Through the above process, the plurality of pre-processed HARQ results of the plurality of HARQ groups can be represented by the combined pre-processed HARQ result and the target resource when the number of the plurality of target HARQ results is large, which saves the target resource.

It should be understood that the above general description and the following detailed description are only exemplary and explanatory, and are not intended to limit the present disclosure.

BRIEF DESCRIPTION OF THE DRAWINGS

The accompanying drawings, which are incorporated in and constitute a part of this disclosure, illustrate examples consistent with the present disclosure and, together with the description, serve to explain the principles of the disclosure.

DETAILED DESCRIPTION

Figure 1:
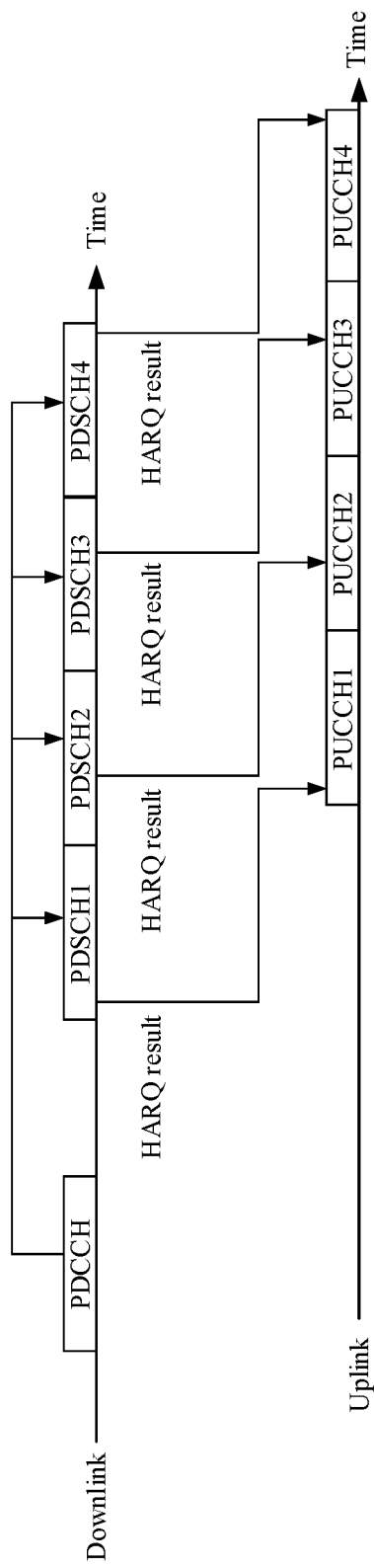
FIG. 1 is a schematic diagram illustrating an HARQ feedback scenario in the art according to an example.

Exemplary embodiments will be described in detail here with the examples thereof expressed in the drawings. Where the following descriptions involve the drawings, like numerals in different drawings refer to like or similar elements unless otherwise indicated. The implementations described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular embodiments only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when", "upon", or "in response to determining".

Figure 2:
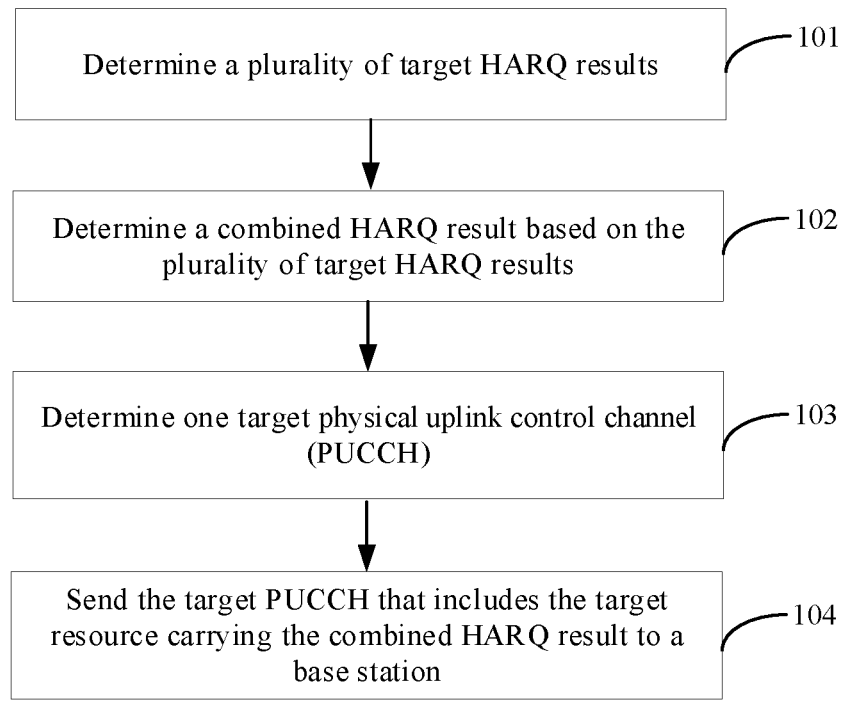
FIG. 2 is a flowchart illustrating an HARQ feedback method according to an example.

Some embodiments of the present disclosure provide an HARQ feedback method, being applicable to an MTC device, such as a smart meter reading applied in a smart city, a sharing bicycle applied in a smart transportation, and a temperature-humidity collecting device applied in a smart agriculture. Referring to FIG. 2, FIG. 2 is a flowchart illustrating an HARQ feedback method according to an example, and may include the following steps.

At step 101, a plurality of target HARQ results are determined. The plurality of target HARQ results correspond to a plurality of respective target PDSCHs which are scheduled by a current PDCCH.

At step 102, a combined HARQ result is determined based on the plurality of target HARQ results. The combined HARQ result is configured to represent the plurality of target HARQ results.

At step 103, one target PUCCH is determined. The target PUCCH includes a target resource carrying the combined HARQ result.

At step 104, the target PUCCH that includes the target resource carrying the combined HARQ result is sent to a base station.

In the above example, the plurality of target HARQ results can be represented by one combined HARQ result, so that HARQ feedback efficiency in an MTC system can be improved and cost of PUCCH resource can be reduced, which facilitate power saving for the MTC device.

With respect to the step 101, since the current PDCCH may schedule the plurality of consecutive PDSCHs together in the MTC system, the MTC device may determine the HARQ result corresponding to each PDSCH according to the related technologies.

In some embodiments, the HARQ result corresponding to each PDSCH may be ACKnowledgement (ACK, which refers to being correct) or Negative ACKnowledgment (NACK, which refers to being wrong).

With respect to the step 102, the MTC device may determine the combined HARQ result based on the plurality of target HARQ results by adopting any one of the following schemes.

In the first scheme, a logical AND operation is performed on respective binary values for the plurality of target HARQ results, and a result of the operation is taken as the combined HARQ result.

Figure 3:
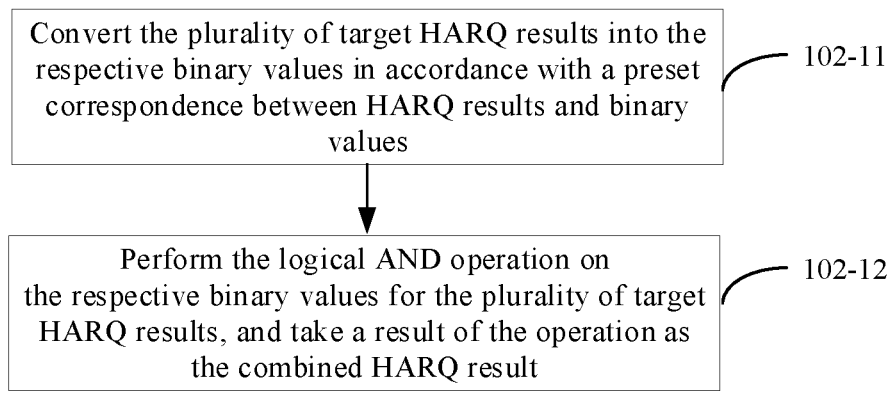
FIG. 3 is a flowchart illustrating another HARQ feedback method according to an example.

In some embodiments, referring to FIG. 3, which is a flowchart illustrating another HARQ feedback method on the basis of the example illustrated in FIG. 2, the step 102 may include the following steps.

At step 102-11, the plurality of target HARQ results are converted into the respective binary values in accordance with a preset correspondence between HARQ results and binary values.

In particular, the MTC device may preset the correspondence between HARQ results and binary values, as shown in Table 1.

TABLE 1

| HARQ results | Binary values |
|---|---|
| NACK | 0 |
| ACK | 1 |

Therefore, the MTC device can convert the plurality of target HARQ results into respective binary values in accordance with Table 1. For example, when the plurality of target HARQ results are ACK, NACK, NACK, and ACK in turn, the converted binary values are 1, 0, 0, and 1 in turn.

At step 102-12, the logical AND operation is performed on the respective binary values for the plurality of target HARQ results, and a result of the operation is taken as the combined HARQ result.

In particular, the MTC device may perform the logical AND operation on all of the respective binary values for the plurality of target HARQ results determined at the step 102-11, and take the result of the operation as the combined HARQ result.

Figure 4:
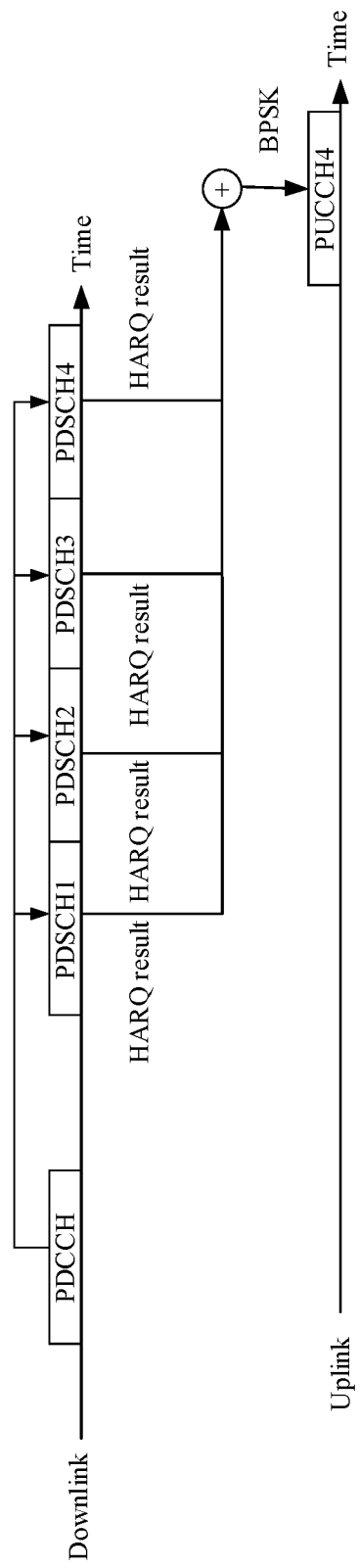
FIG. 4 is a schematic diagram illustrating another HARQ feedback scenario according to an example.

For example, as illustrated in FIG. 4, the respective binary values for the plurality of target HARQ results are 1, 0, 0, 1 in turn, and after the logical AND operation, the obtained result of the operation is 0, that is, the combined HARQ result is 0.

In some embodiments of the present disclosure, the combined HARQ result is 1 only when each of the plurality of target HARQ results is 1, otherwise the combined HARQ result is 0. If the combined HARQ result received on the base station side is 1, it indicates that the MTC device successfully receives all of the target PDSCHs scheduled by the current PDCCH, otherwise it indicates that the MTC device does not successfully receive all of the target PDSCHs scheduled by the current PDC CH.

In the above example, the MTC device can perform the logical AND operation on the respective binary values for the plurality of target HARQ results, and finally take the result of the operation as the combined HARQ result, so that a purpose that the plurality of target HARQ results are represented by one combined HARQ result can be implemented, which is highly available.

In the second scheme, a logical AND operation is performed on respective binary values for the target HARQ results included in each HARQ group, and a result of the operation is taken as the combined HARQ result of the current HARQ group.

Figure 5:
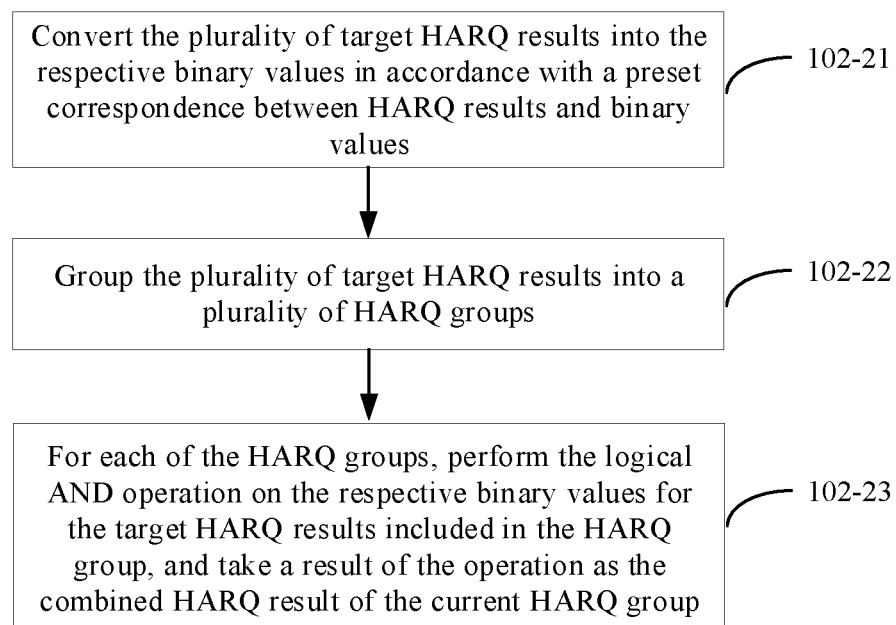
FIG. 5 is a flowchart illustrating another HARQ feedback method according to an example.

In some embodiments, referring to FIG. 5, which is a flowchart illustrating another HARQ feedback method on the basis of the example illustrated in FIG. 2, the step 102 may include the following steps.

At step 102-21, the plurality of target HARQ results are converted into the respective binary values in accordance with a preset correspondence between HARQ results and binary values.

This step may be implemented in a same way as the step 102-11 described above, and is not described herein again.

At step 102-22, the plurality of target HARQ results are grouped into a plurality of HARQ groups.

In particular, due to a large number of the plurality of target HARQ results, the plurality of target HARQ results may be grouped into the plurality of HARQ groups.

For example, when their total number is 4, the plurality of target HARQ results may be divided averagely into two groups, with each group including 2 target HARQ results.

At step 102-23, for each of the HARQ groups, the logical AND operation is performed on the respective binary values for the target HARQ results included in the HARQ group, and a result of the operation is taken as the combined HARQ result of the current HARQ group.

Figure 6:
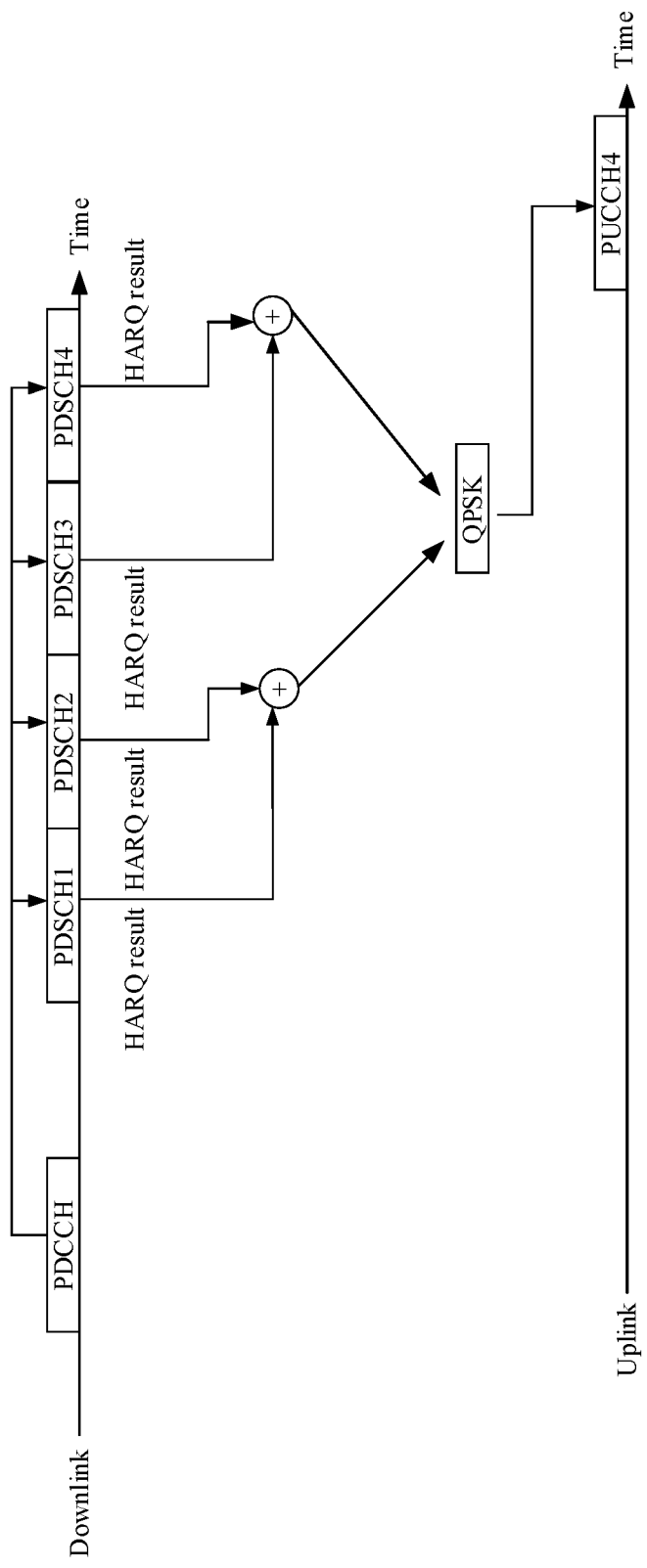
FIG. 6 is a schematic diagram illustrating another HARQ feedback scenario according to an example.

For example, as illustrated in FIG. 6, assuming that the respective binary values for the plurality of target HARQ results are 1, 0, 1, 1 in turn and are divided into two groups, the respective binary values for the target HARQ results included in HARQ group 1 are 1 and 0, while the respective binary values for the target HARQ results included in HARQ group 2 are 1 and 1. Following the individual logical AND operation on each HARQ group, the result of the operation on the HARQ group 1 is 0, i.e., the combined HARQ result of the HARQ group 1 is 0; and, the result of the operation on the HARQ group 2 is 1, i.e., the combined HARQ result of the HARQ group 2 is 1.

In some embodiments of the present disclosure, if the combined HARQ result of the HARQ group 1 received on the base station side is 0, it indicates that the MTC device does not successfully receive the first two target PDSCHs scheduled by the current PDCCH, while if the combined HARQ result of the HARQ group 2 received on the base station side is 1, it indicates that the MTC device successfully receives the last 2 target PDSCHs scheduled by the current PDCCH.

In the above example, the MTC device can group the plurality of target HARQ results, so as to determine the combined HARQ result of each HARQ group, which is highly available.

In the third scheme, the plurality of target HARQ results are sorted in sequence, and channel coding, scrambling and modulation are performed in turn to obtain the combined HARQ result.

In particular, the MTC device may directly sort the plurality of target HARQ results in sequence, and then perform channel coding, scrambling, and modulation according to the related technologies, so as to obtain the combined HARQ result. Thus, all of the target HARQ results are included in the combined HARQ result, so that the reported result can be rather accurate. Also, HARQ feedback efficiency in the MTC system can be improved and cost of PUCCH resource can be reduced, which facilitate power saving for the MTC device.

With respect to the step 103, the MTC device may determine one target PUCCH by adopting any one of the following schemes.

In the first scheme, a target index value of the target resource is determined, and a PUCCH indicated by the target index value is taken as the target PUCCH.

Figure 7:
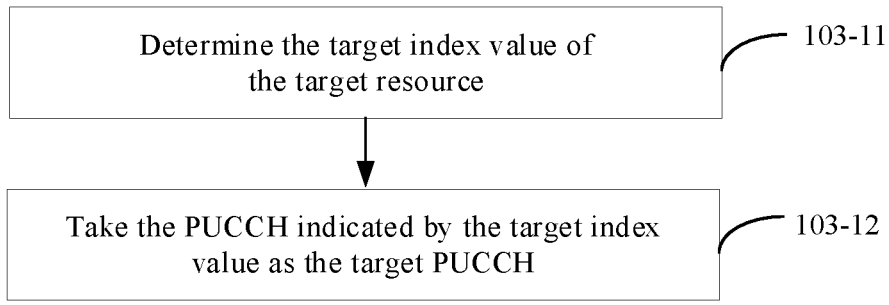
FIG. 7 is a flowchart illustrating another HARQ feedback method according to an example.

In some embodiments, referring to FIG. 7, which is a flowchart illustrating another HARQ feedback method on the basis of the example illustrated in FIG. 2, the step 103 may include the following steps.

At step 103-11, the target index value of the target resource is determined.

In some embodiments of the present disclosure, the target index value may be determined based on a value corresponding to a target starting position, a target CCE index value of a search space, and a first target offset. In some embodiments, it is possible to calculate a sum of the value corresponding to the target starting position, the target CCE index value of the search space and the first target offset, and take the sum as the target index value. Of course, the other calculating ways may be adopted to calculate the target index value based on the value corresponding to the target starting position, the target CCE index value of the search space and the first target offset, which is not limited in this disclosure.

In particular, the target starting position is configured by a higher-layer signaling, such as an RRC signaling, and indicates a starting position of a PUCCH resource carrying an HARQ result. For example, the MTC device has 50 PUCCH resources, but the resources starting from the 25th PUCCH are capable of carrying HARQ results, so the value corresponding to the target starting position is 25.

The target CCE index value indicates a minimum CCE index value of the current PDCCH. For example, a pre-configured CCE index set of the current PDCCH is {4,5,6,7}, so the smallest CCE index value is 4, that is, the target CCE index value is 4.

The first target offset is carried by the current PDCCH and indicates an offset of a PUCCH resource for HARQ result feedback. In some embodiments, the base station may configure an offset set for the current PDCCH through an RRC signaling in advance, and then one offset may be indicated from the above offset set by the PDCCH as the first target offset. For example, the offset set configured by the base station in advance is {2,4,6,8}, and the current PDCCH indicates 2 from the set as the first target offset.

In this step, the MTC device may perform calculation in accordance with the following Formula 1, so as to obtain the target index value n_PUCCH.

$$n\_PUCCH = N\_PUCCH + n\_CCE + ARO, \quad \text{Formula 1}$$

In particular, N_PUCCH is the value corresponding to the target starting position, n_CCE is the target CCE index value, and ARO is the first target offset.

At step 103-12, the PUCCH indicated by the target index value is taken as the target PUCCH.

In particular, assuming that the target index value n_PUCCH=25+4+2=31, the MTC device takes the PUCCH indicated by the target index value as the target PUCCH, that is, takes the 31st PUCCH as the target PUCCH.

In the above example, during determining the one target PUCCH, the MTC device can firstly determine the target index value of the target resource, and then take the PUCCH indicated by the target index value as the target PUCCH. In some embodiments, it is possible to determine the target index value based on the value corresponding to the target starting position, the target CCE index value of the search space and the first target offset. Through the above process, the MTC device can determine the target PUCCH quickly, which is convenient to subsequently carry the combined HARQ result through the target resource of the target PUCCH.

In the second scheme, the one target PUCCH may be determined from a PUCCH set including a plurality of candidate PUCCHs.

Figure 8:
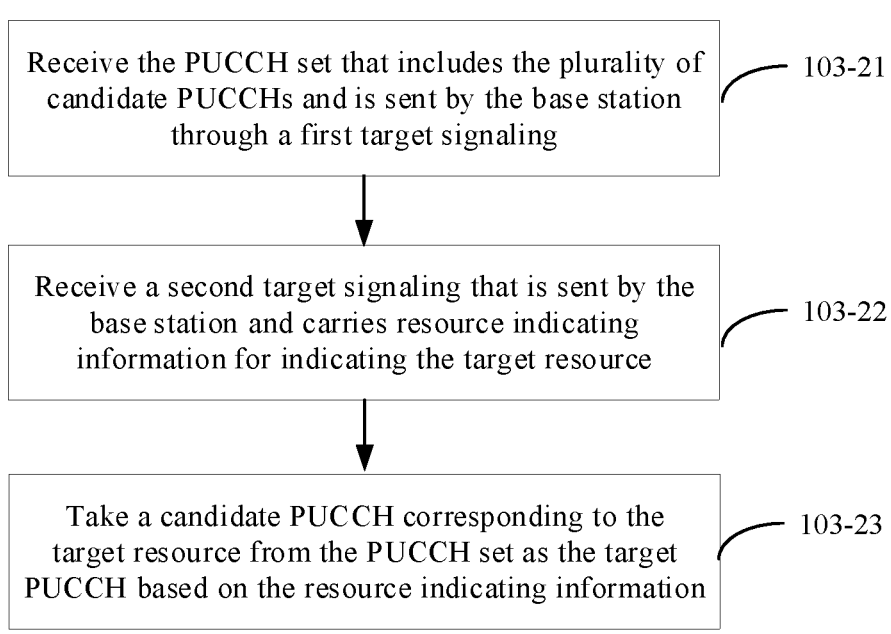
FIG. 8 is a flowchart illustrating another HARQ feedback method according to an example.

In some embodiments, referring to FIG. 8, which is a flowchart illustrating another HARQ feedback method on the basis of the example illustrated in FIG. 2, the step 103 may include the following steps.

At step 103-21, the PUCCH set is received. The PUCCH set includes the plurality of candidate PUCCHs and is sent by the base station through a first target signaling.

In particular, the first target signaling may be an RRC signaling through which the base station sends the PUCCH set to the MTC device, and the PUCCH set includes the plurality of candidate PUCCHs. For example, the PUCCH set may be {n_PUCCH1, n_PUCCH2, n_PUCCH3, n_PUCCH4}.

At step 103-22, a second target signaling sent by the base station is received. The second target signaling carries resource indicating information for indicating the target resource.

In particular, the MTC device may also receive the second target signaling sent by the base station, and the second target signaling carries the resource indicating information for indicating the target resource. In some embodiments, the second target signaling may be a DCI signaling.

At step 103-23, a candidate PUCCH corresponding to the target resource is taken from the PUCCH set as the target PUCCH based on the resource indicating information.

In particular, the base station may determine the target PUCCH from the PUCCH set based on the previous resource indicating information. For example, if the base station indicates through the resource indicating information carried in the DCI signaling that the target resource is a resource of n_PUCCH1, the MTC device takes n_PUCCH1 as the target PUCCH.

In the above example, the MTC device can quickly determine the target PUCCH based on the signaling sent by the base station, which is simple to be implemented and is highly available.

With respect to the step 104, in some embodiments, the MTC device may make the combined HARQ result carried by the target resource of the target PUCCH according to the related technologies, and send the target PUCCH to the base station in a preset PUCCH format according to the related technologies.

In particular, if the MTC device performs the logical AND operation on the respective binary values for the plurality of target HARQ results and takes the result of the operation as the combined HARQ result, it may perform BPSK-modulation on the combined HARQ result according to the related technologies, and then send the target PUCCH to the base station in a PUCCH format 1a.

If the MTC device performs the logical AND operation on the respective binary values for the target HARQ results included in each HARQ group and takes the result of the operation as the combined HARQ result of the current HARQ group, it may perform BPSK-modulation on the respective combined HARQ results of all the HARQ groups according to the related technologies, and then send the target PUCCH to the base station in a PUCCH format 1b.

If the MTC device sorts the plurality of target HARQ results in sequence, performs channel coding, scrambling, and modulation in turn, and obtains the combined HARQ result, it may send the target PUCCH to the base station in a PUCCH format 3.

In the above embodiments, when the MTC device makes the combined HARQ result carried by the target resource and sends the target PUCCH to the base station, it is optional to send the target PUCCH in the preset PUCCH format, which is simple to be implemented and can improve HARQ feedback efficiency in the MTC system.

Figure 9:
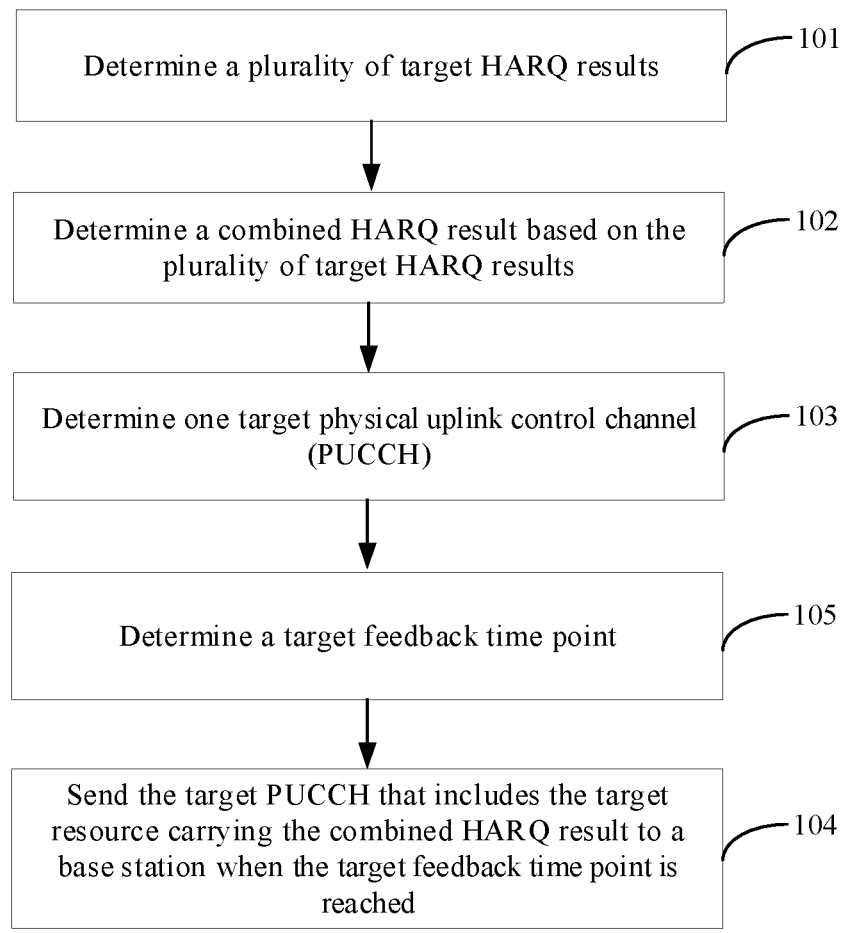
FIG. 9 is a flowchart illustrating another HARQ feedback method according to an example.

In an example, referring to FIG. 9, which is a flowchart illustrating another HARQ feedback method on the basis of the example illustrated in FIG. 2, the above method may further include the following step.

At step 105, a target feedback time point is determined.

In particular, the MTC device may determine a time point configured to feed back the combined HARQ result.

Accordingly, the step 104 may include that:

when the target feedback time point is reached, the target PUCCH that includes the target resource carrying the combined HARQ result is sent to the base station.

That is, when the target feedback time point is reached, it is possible to make the above combined HARQ result carried by the target resource of the target PUCCH and send the target PUCCH to the base station.

Figure 10:
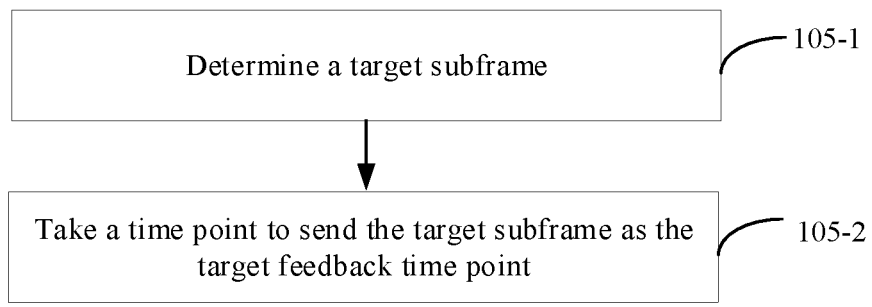
FIG. 10 is a flowchart illustrating another HARQ feedback method according to an example.

In the above example, referring to FIG. 10, which is a flowchart illustrating another HARQ feedback method on the basis of the example illustrated in FIG. 9, the step 105 may further include the following step.

At step 105-1, a target subframe is determined. The target subframe is a first one of valid subframes which are spaced from a candidate subframe by a preset number of subframes. The candidate subframe is a subframe in which a last one of the plurality of PDSCHs scheduled by the current PDCCH locates.

In particular, the MTC device may take the first one of the valid subframes which are spaced from the candidate subframe by the preset number of subframes as the target subframe, and the candidate subframe is the subframe in which the last one of the plurality of PDSCHs scheduled by the current PDCCH locates.

Considering that the MTC system may coexist with an LTE system at present, some subframes may be configured for communication in the MTC system, and some subframes may be configured to be scheduled by the LTE system. Therefore, the target subframe may be the first one of the valid subframes indicates spaced from the candidate subframe by a preset number of subframes, that is, the target subframe is the first one of the subframes which are spaced from the candidate subframe by the preset number of subframes and are scheduled for the MTC system.

In a frequency division duplexing (FDD) MTC system, the preset number of subframes may be 4. In a time division duplexing (TDD) system, the preset number of subframes may be determined based on a TDD subframe configuration. For example, in the TDD MTC system, it may be specified in advance that the 2nd, 4th, 6th, and 8th subframes behind the candidate subframe are configured for the HARQ feedback. Therefore, the MTC device may determine a preset number of subframes, e.g., 2, based on a DCI signaling sent by the base station, and then take the second subframe behind the candidate subframe as the target subframe.

At step 105-2, a time point to send the target subframe is taken as the target feedback time point.

In particular, the MTC system directly takes the time point to send the target subframe as the target feedback time point according to the related technologies.

In the above example, the plurality of target HARQ results can be reported to the base station together after the last one of the plurality of PDSCHs scheduled by the current PDCCH has been scheduled, so that HARQ feedback efficiency in the MTC system can be improved and cost of PUCCH resource can be reduced, which facilitate power saving for the MTC device.

The foregoing HARQ feedback methods provided by the examples of the present disclosure are further exemplified as follows.

Example 1. The MTC device may convert the plurality of target HARQ results into corresponding binary values in accordance with the preset correspondence between HARQ results and binary values. Further, the MTC device may perform the logical AND operation on the respective binary values for the plurality of target HARQ results, and finally take the result of the operation as the combined HARQ result. The MTC device may perform BPSK adjustment on the combined HARQ result, and then send the target PUCCH to the base station in the PUCCH format 1a, as illustrated in FIG. 4.

Alternatively, the MTC device may group the plurality of HARQ results and perform the logical AND operation on the respective binary values for the target HARQ results included in each HARQ group, so as to take the result of the operation as the combined HARQ result of the current HARQ group. The MTC device may perform QPSK adjustment on the combined HARQ result of each HARQ group, and then send the target PUCCH to the base station in the PUCCH format 1b, as illustrated in FIG. 6.

When the target feedback time point is reached, the MTC device may make the combined HARQ result carried by the target resource and send the target PUCCH to the base station. How to determine the target feedback time point is illustrated in FIG. 10, which is not repeated here.

In addition, the above Formula 1 may be adopted by the MTC device to determine the target PUCCH. Alternatively, the MTC device may receive the first target signaling sent by the base station, determine the PUCCH set, and then determine the target PUCCH from the PUCCH set based on the second target signaling sent by the base station.

Example 2. The MTC device may directly sort the plurality of target HARQ results in sequence, perform channel coding, scrambling and modulation in turn to obtain the combined HARQ result, and then send the target PUCCH to the base station in the PUCCH format 3.

When the target feedback time point is reached, the MTC device may make the combined HARQ result carried by the target resource and send the target PUCCH to the base station. How to determine the target feedback time point is illustrated in FIG. 10, which is not repeated here.

In addition, the above Formula 1 may be adopted by the MTC device to determine the target PUCCH. Alternatively, the MTC device may receive the first target signaling sent by the base station, determine the PUCCH set, and then determine the target PUCCH from the PUCCH set based on the second target signaling sent by the base station.

All of the above examples are directed to such an implementation that the plurality of target HARQ results are represented only by the combined HARQ result. In some embodiments of the present disclosure, it is possible to represent the plurality of target HARQ results by both the combined HARQ result and the target resource in the following implementations.

Figure 11:
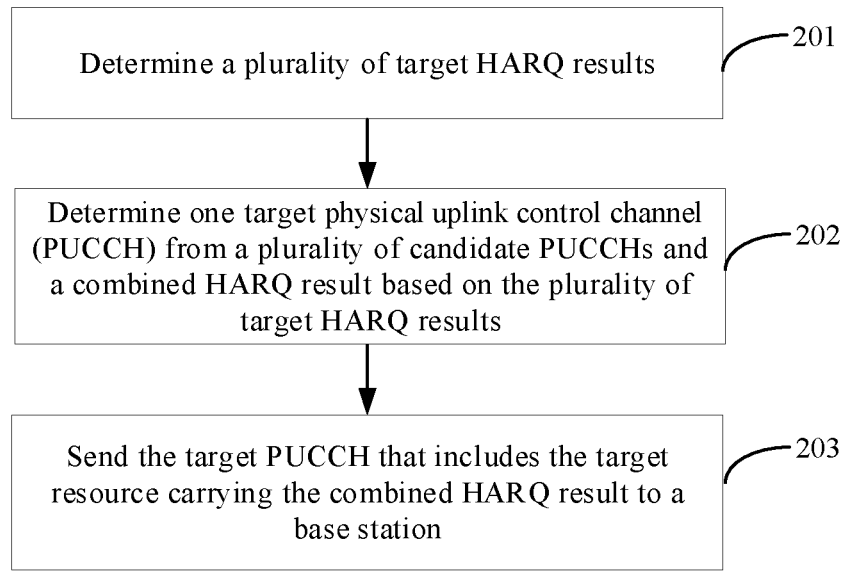
FIG. 11 is a flowchart illustrating another HARQ feedback method according to an example.

The embodiments of the present disclosure provide another HARQ feedback method, being applicable to an MTC device, such as a smart meter reading applied in a smart city, a sharing bicycle applied in a smart transportation, and a temperature-humidity collection device applied in a smart agriculture. Referring to FIG. 11, FIG. 11 is a flowchart illustrating another HARQ feedback method according to an example, and may include the following steps.

At step 201, a plurality of target HARQ results are determined. The plurality of target HARQ results correspond to a plurality of respective target PDSCHs which are scheduled by a current PDCCH.

At step 202, one target PUCCH from a plurality of candidate PUCCHs and a combined HARQ result are determined based on the plurality of target HARQ results. The target PUCCH includes a target resource carrying the combined HARQ result, and the combined HARQ result and the target resource are configured to represent the plurality of target HARQ results.

At step 203, the target PUCCH that includes the target resource carrying the combined HARQ result is sent to a base station.

In the above example, such a purpose can be achieved that the plurality of target HARQ results are represent by both the combined HARQ result and the target resource of the target PUCCH, so that the target resource is further saved and HARQ feedback efficiency in an MTC system can be improved, which facilitate power saving for the MTC device.

With respect to the step 201, since the current PDCCH may schedule the plurality of consecutive PDSCHs together in the MTC system, the MTC device may determine the HARQ result corresponding to each PDSCH according to the related technologies.

In some embodiments, the HARQ result corresponding to each PDSCH may be ACK or NACK.

Figure 12:
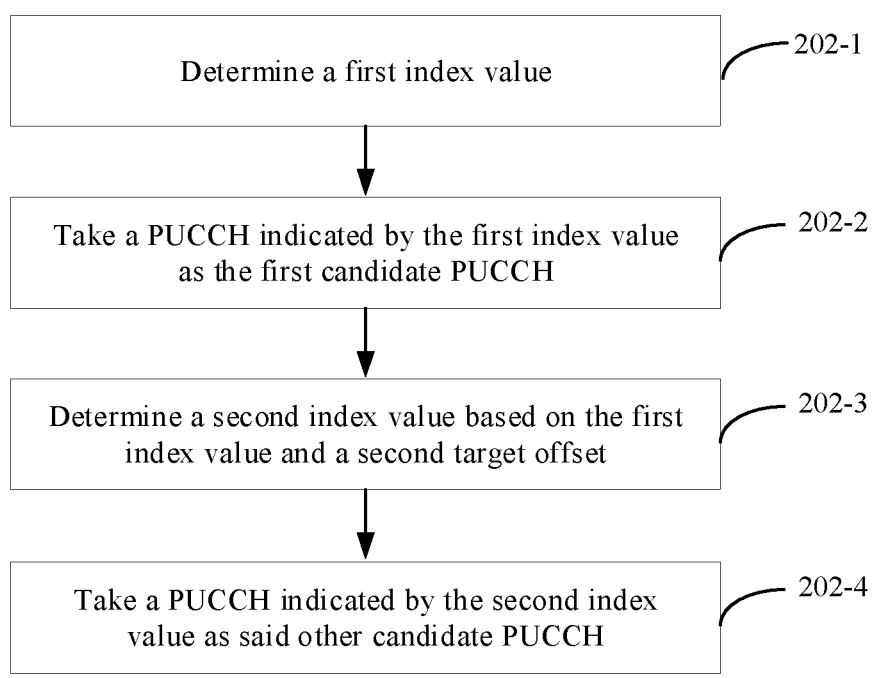
FIG. 12 is a flowchart illustrating another HARQ feedback method according to an example.

With respect to the step 202, the MTC device may firstly determine the plurality of candidate PUCCHs. In some embodiments, as illustrated in FIG. 12, which is a flowchart illustrating another HARQ feedback method on the basis of the example illustrated in FIG. 11, the process of determining the plurality of candidate PUCCHs may include the following steps.

At step 202-1, a first index value is determined. The first index value is a resource index value of a first one of the plurality of candidate PUCCHs.

In some embodiments of the present disclosure, the first index value may be determined based on a value corresponding to a target starting position, a target CCE index value of a search space, and a first target offset. In some embodiments, it is possible to calculate a sum of the value corresponding to the target starting position, the target CCE index value of the search space and the first target offset, and take the sum as the first index value. Of course, the other calculating ways may be adopted to calculate the first index value based on the value corresponding to the target starting position, the target CCE index value of the search space and the first target offset, which is not limited in this disclosure.

In particular, the target starting position is configured by a higher-layer signaling, such as an RRC signaling, and indicates a starting position of a PUCCH resource carrying an HARQ result, the target CCE index value indicates a minimum CCE index value of the current PDCCH, and the first target offset is carried by the current PDCCH and indicates an offset of a PUCCH resource for HARQ result feedback.

In this step, the MTC device may calculate the first index value $n\_PUCCH1$ in accordance with the following Formula 2.

$$n\_PUCCH1 = N\_PUCCH + n\_CCE + ARO, \quad \text{Formula 2}$$

In particular, $N\_PUCCH$ is the value corresponding to the target starting position, $n\_CCE$ is the target CCE index value, and ARO is the first target offset.

At step 202-2, a PUCCH indicated by the first index value is taken as the first candidate PUCCH.

In particular, assuming that the first sum $n\_PUCCH1 = 25 + 4 + 2 = 31$, the MTC device takes the PUCCH indicated by the first index value as the first one of the plurality candidate PUCCHs, that is, the 31st PUCCH is taken as the first one of the plurality of candidate PUCCHs.

At step 202-3, a second index value is determined based on the first index value and a second target offset.

In some embodiments of the present disclosure, the second target offset is pre-configured to indicate an offset of a PUCCH resource of other candidate PUCCH, and said other candidate PUCCH is a plurality of candidate PUCCH other than the first candidate PUCCH. In some embodiments, the second target offset may be specified in a protocol in advance and written into an underlying system of the MTC device; or the second target offset may be configured by the base station for the MTC device through a first target signaling, such as an RRC signaling; or the second target offset may be instructed by the base station to the MTC device through a second target signaling, such as a DCI signaling.

In this step, the MTC device may calculate the second index value n_PUCCHi by adopting Formula 3, where i=2, 3, 4, etc.

$$n\_PUCCHi = N\_PUCCH + n\_CCE + ARO + \text{offset } i, \quad \text{Formula 3}$$

In particular, N_PUCCH is the target starting position, n_CCE is the target CCE index value, ARO is the first target offset, and offset i is the second target offset.

At step 202-4, a PUCCH indicated by the second index value is taken as said other candidate PUCCH.

In particular, the MTC device may determine said other candidate PUCCH in accordance with Formula 3.

In some embodiments of the present disclosure, if a total number of the plurality of target HARQ results is 2, two candidate PUCCHs may be determined respectively in accordance with Formula 2 and Formula 3:

$$n\_PUCCH1 = N\_PUCCH + n\_CCE + ARO;$$

$$n\_PUCCH2 = N\_PUCCH + n\_CCE + ARO + \text{offset } 2.$$

Similarly, if the total number of the plurality of target HARQ results is 3, three candidate PUCCHs may be determined respectively in accordance with Formula 2 and Formula 3:

$$n\_PUCCH1 = N\_PUCCH + n\_CCE + ARO;$$

$$n\_PUCCH2 = N\_PUCCH + n\_CCE + ARO + \text{offset } 2;$$

$$n\_PUCCH3 = N\_PUCCH + n\_CCE + ARO + \text{offset } 3.$$

In this way, it is possible to obtain the plurality of candidate PUCCHs.

Of course, if the total number of the target HARQ results is large, the plurality of target HARQ results may be grouped, and one candidate PUCCH may be determined for each HARQ group.

For example, if the total number of the target HARQ results is 8 and they are divided averagely into 4 groups, there may be 4 candidate PUCCHs, as follows:

$$n\_PUCCH1 = N\_PUCCH + n\_CCE + ARO;$$

$$n\_PUCCH2 = N\_PUCCH + n\_CCE + ARO + \text{offset } 2;$$

$$n\_PUCCH3 = N\_PUCCH + n\_CCE + ARO + \text{offset } 3;$$

$$n\_PUCCH4 = N\_PUCCH + n\_CCE + ARO + \text{offset } 4.$$

In some embodiments of the present disclosure, after determining the plurality of candidate PUCCHs, the MTC device may select the one target PUCCH from the plurality of candidate PUCCHs. In some embodiments, the one target PUCCH from the plurality of candidate PUCCHs and a combined HARQ result may be determined based on a preset mapping relationship among target HARQ results, target resources and combined HARQ results.

For example, the preset mapping relationship among target HARQ results, target resources and combined HARQ results are shown in Table 2.

TABLE 2

| Combined HARQ results | Target resources | Target HARQ results which are represented |
|---|---|---|
| X (X may be 0 or 1) | n_PUCCH 1<br>n_PUCCH 2 | X0<br>X1 |

Thus, the MTC device may directly determine the one target PUCCH from the plurality of candidate PUCCHs and the combined HARQ result in accordance with Table 2. For example, if the plurality of target HARQ results are 0 and 1, the combined HARQ result is 0 and the target resource is n_PUCCH 2.

With respect to the step 203, the MTC device may send the target PUCCH that includes the target resource carrying the combined HARQ result to the base station according to the related technologies.

Figure 13:
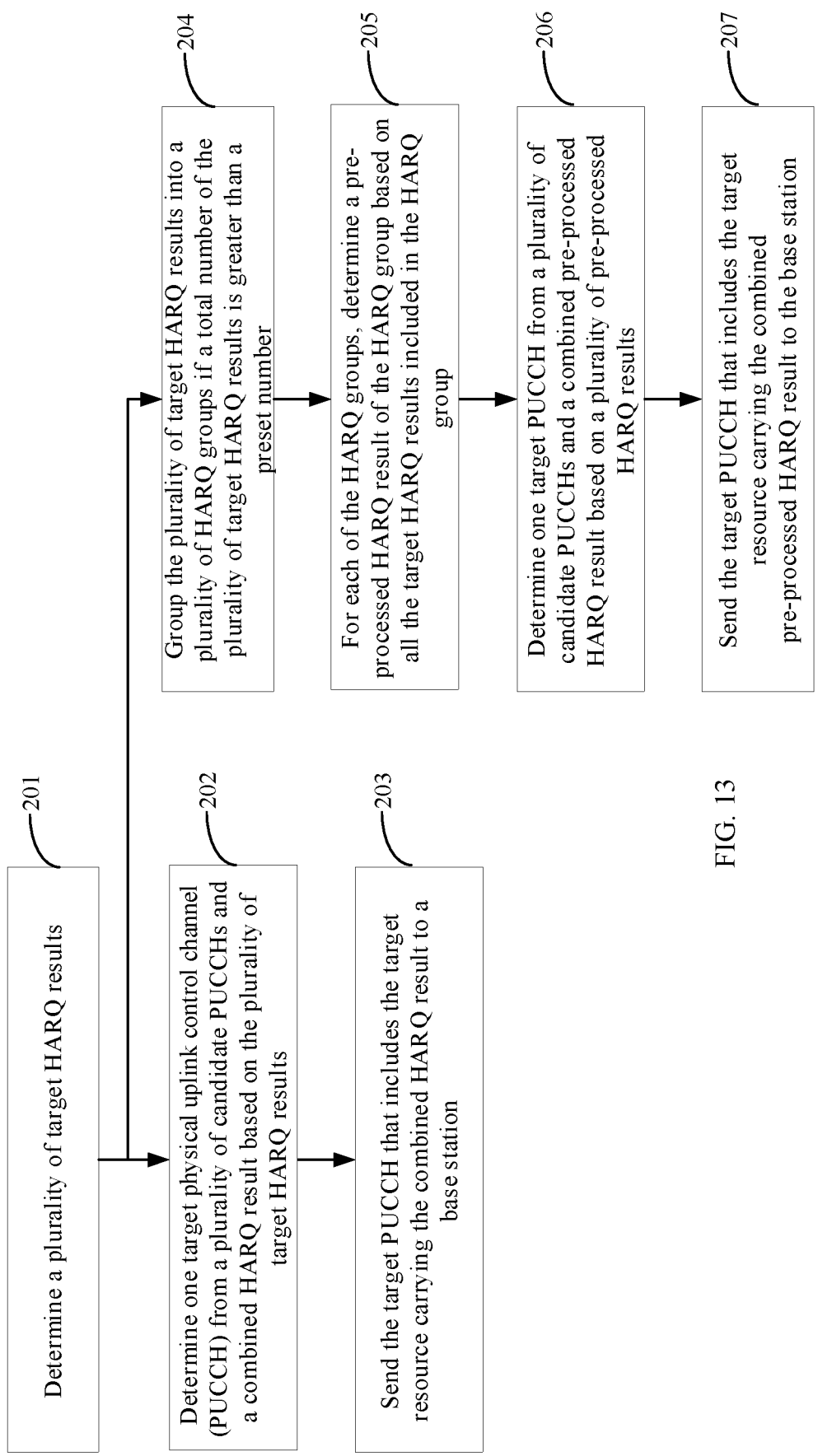
FIG. 13 is a flowchart illustrating an HARQ feedback method according to an example.

In an example, referring to FIG. 13, which is a flowchart illustrating another HARQ feedback method on the basis of the example illustrated in FIG. 11, the method may further include the following step.

At step 204, if a total number of the plurality of target HARQ results is greater than a preset number, the plurality of target HARQ results are grouped into a plurality of HARQ groups.

In particular, the MTC device may group the plurality of target HARQ results into the plurality of HARQ groups when the total number of the plurality of target HARQ results is greater than the preset number, e.g., 4. In some embodiments, the plurality of target HARQ results may be divided averagely into the plurality of HARQ groups.

At step 205, for each of the HARQ groups, a pre-processed HARQ result of the HARQ group is determined based on all the target HARQ results included in the HARQ group.

In particular, for each of the HARQ groups, all the target HARQ results included in the HARQ group may be converted into binary values, a logical AND operation is then performed, and a result of the operation is taken as the pre-processed HARQ result of the current HARQ group.

For example, if all the target HARQ results included in the current HARQ group are ACK and NACK in turn, the converted binary values are 1 and 0 in turn and after the logical AND operation, the pre-processed HARQ result of the current HARQ group is 0.

At step 206, one target PUCCH from the plurality of candidate PUCCHs and a combined pre-processed HARQ result are determined based on a plurality of pre-processed HARQ results. The target PUCCH includes a target resource carrying the combined pre-processed HARQ result. The combined pre-processed HARQ result and the target resource are configured to represent the plurality of pre-processed HARQ results.

In particular, the MTC device may determine the one target PUCCH and the combined pre-processed HARQ result based on a preset mapping relationship among pre-processed HARQ results, target resources and combined pre-processed HARQ results.

For example, the preset mapping relationship among pre-processed HARQ results, target resources and combined pre-processed HARQ results is shown in Table 3.

TABLE 3

| Combined pre-processed HARQ results | Target resources | Pre-processed HARQ results which are represented |
|---|---|---|
| X Y (X may be 0 or 1, and Y may be 0 or 1) | n_PUCCH 1<br>n_PUCCH 2<br>n_PUCCH 3 | XY0<br>XY1<br>Reserved |

Thus, if the plurality of pre-processed results are 1, 1, and 0, it can be determined, in accordance with Table 3, that the combined pre-processed HARQ result is 11 and the target resource is n_PUCCH 1.

At step 207, the target PUCCH that includes the target resource carrying the combined pre-processed HARQ result is sent to the base station.

In particular, after determining the target resource and the combined pre-processed HARQ result, the MTC device may make the combined pre-processed HARQ result carried by the target resource and send the target PUCCH to the base station.

Figure 14:
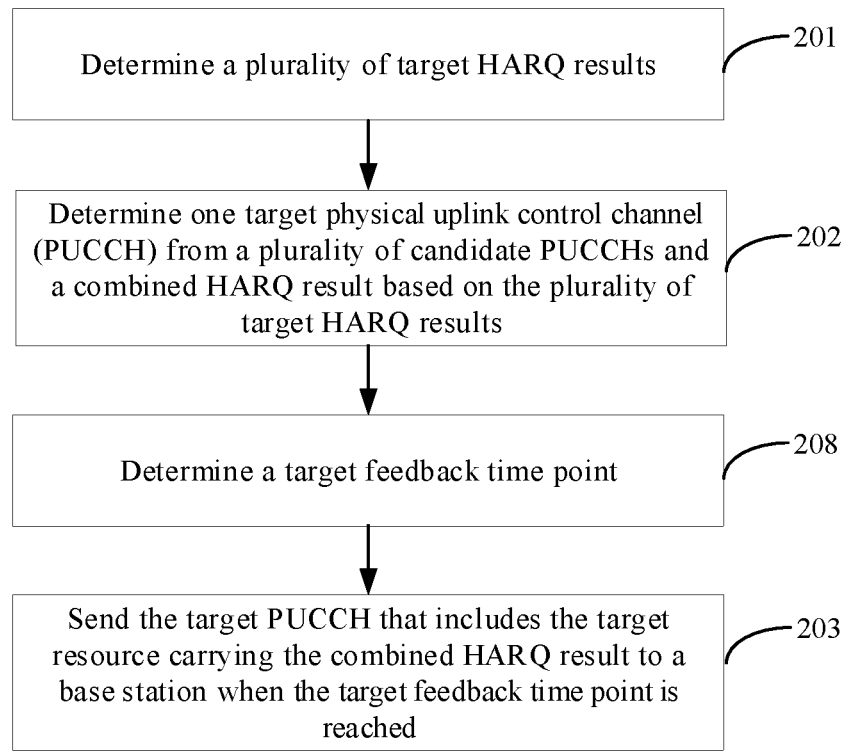
FIG. 14 is a flowchart illustrating an HARQ feedback method according to an example.

In an example, referring to FIG. 14, which is a flowchart illustrating another HARQ feedback method on the basis of the example illustrated in FIG. 11, the method may further include the following step.

At step 208, a target feedback time point is determined.

In particular, the MTC device may determine a time point configured to feed back the combined HARQ result.

Accordingly, the step 203 may include that:

when the target feedback time point is reached, the target PUCCH that includes the target resource carrying the combined HARQ result is sent to the base station.

That is, when the target feedback time point is reached, it is possible to make the above combined HARQ result carried by the target resource of the target PUCCH and send the target PUCCH to the base station.

Figure 15:
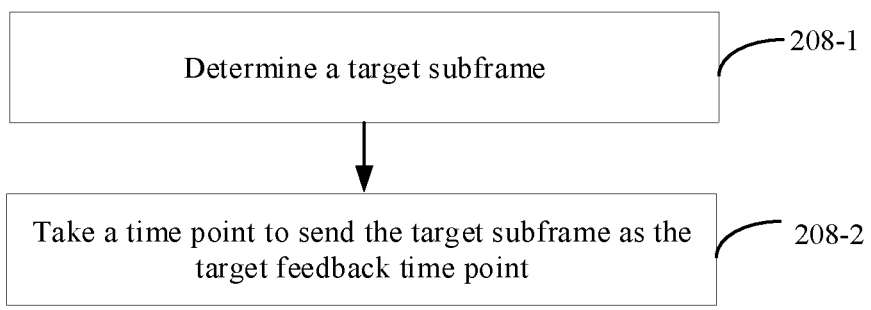
FIG. 15 is a flowchart illustrating another HARQ feedback method according to an example.

In the above example, referring to FIG. 15, which is a flowchart illustrating another HARQ feedback method on the basis of the example illustrated in FIG. 14, the step 208 may further include the following steps.

At step 208-1, a target subframe is determined. The target subframe is a first one of valid subframes which are spaced from a candidate subframe by a preset number of subframes. The candidate subframe is a subframe in which a last one of the plurality of PDSCHs scheduled by the current PDCCH locates.

In particular, the MTC device may take the first one of the valid subframes which are spaced from the candidate subframe by the preset number of subframes as the target subframe, and the candidate subframe is the subframe in which the last one of the plurality of PDSCHs scheduled by the current PDCCH locates.

Considering that the MTC system may coexist with an LTE system at present, some subframes may be configured for communication in the MTC system, and some subframes may be configured to be scheduled by the LTE system. Therefore, the target subframe may be the first one of the valid subframes which are spaced from the candidate subframe by the preset number of subframes, that is, the target subframe is the first one of the subframes which are spaced from the candidate subframe by the preset number of subframes and are scheduled for the MTC system.

In a FDD MTC system, the preset number of subframes may be 4. In a TDD system, the preset number of subframes may be determined based on a TDD subframe configuration. For example, in the TDD MTC system, it may be specified in advance that the 2nd, 4th, 6th, and 8th subframes behind the candidate subframe are configured for the HARQ feedback. Therefore, the MTC device may determine a preset number of subframes, e.g., 2, based on a DCI signaling sent by the base station, and then take the second subframe behind the candidate subframe as the target subframe.

At step 208-2, a time point to send the target subframe is taken as the target feedback time point.

In particular, the MTC system directly takes the time point to send the target subframe as the target feedback time point according to the related technologies.

In the above example, the plurality of target HARQ results can be reported to a base station together after the last one of the plurality of PDSCHs scheduled by the current PDCCH has been scheduled, so that HARQ feedback efficiency in the MTC system can be improved and cost of PUCCH resource can be reduced, which facilitate power saving for the MTC device.

The above HARQ feedback methods provided according to the examples, in which the plurality of target HARQ results are represented by both the target resource and the combined HARQ result, are further illustrated as follows.

Example 3. The total number of the plurality of target HARQ results is 2, and the MTC device determines two candidate PUCCHs based on the above Formula 2 and Formula 3 as follows:

$n\_PUCCH1 = N\_PUCCH + n\_CCE + ARO;$ $n\_PUCCH2 = N\_PUCCH + n\_CCE + ARO + \text{offset } 2.$ One of the target HARQ results is fed back through the target resource, and the other is fed back through the combined HARQ result carried by the target PUCCH. The preset mapping relationship among target HARQ results, target resources and combined HARQ results is shown in Table 2 above.

Thus, if the plurality of target HARQ results are 1 and 1, the combined HARQ result is 1, i.e., X is 1, and the target resource is n_PUCCH2.

Assuming further that the total number of the plurality of target HARQ results is 3, and the MTC device determines three candidate PUCCHs based on the above Formula 2 and Formula 3 as follows:

$n\_PUCCH1 = N\_PUCCH + n\_CCE + ARO;$ $n\_PUCCH2 = N\_PUCCH + n\_CCE + ARO + \text{offset } 2;$ $n\_PUCCH3 = N\_PUCCH + n\_CCE + ARO + \text{offset } 3.$ Two of the target HARQ results are fed back through the combined HARQ result, and another is fed back through the target resource. The preset mapping relationship among target HARQ results, target resources and combined HARQ results is shown in Table 4.

TABLE 4

| Combined HARQ results | Target resources | Target HARQ results which are represented |
|---|---|---|
| X Y (X may be 0 or 1, and Y may be 0 or 1) | n_PUCCH 1<br>n_PUCCH 2<br>n_PUCCH 3 | XY0<br>XY1<br>Reserved |

Thus, if the plurality of target HARQ results are 1, 0, and 1, the combined HARQ result is 10, i.e., X and Y are 1 and 0 respectively, and the target resource is n_PUCCH 2.

Assuming further that the total number of the plurality of target HARQ results is 4, and the MTC device determines four candidate PUCCHs based on the above Formula 2 and Formula 3 as follows:

$n\_PUCCH1 = N\_PUCCH + n\_CCE + ARO;$ $n\_PUCCH2 = N\_PUCCH + n\_CCE + ARO + \text{offset } 2;$ $n\_PUCCH3 = N\_PUCCH + n\_CCE + ARO + \text{offset } 3;$ $n\_PUCCH4 = N\_PUCCH + n\_CCE + ARO + \text{offset } 4.$ Two of the target HARQ results are fed back through the combined HARQ result, and the others are fed back through the target resource. The preset mapping relationship among target HARQ results, target resources and combined HARQ results is shown in Table 5.

TABLE 5

| Combined HARQ results | Target resources | Target HARQ results which are represented |
|---|---|---|
| X Y (X may be 0 or 1, and Y may be 0 or 1) | n_PUCCH 1 | XY00 |
| | n_PUCCH 2 | XY01 |
| | n_PUCCH 3 | XY10 |
| | n_PUCCH 4 | XY11 |

Thus, if the plurality of target HARQ results are 1, 0, 1, and 1, the combined HARQ result is 10, i.e., X and Y are 1 and 0 respectively, and the target resource is n_PUCCH 4.

Assuming further that there are more than 4 target HARQ results, for example, 8 target HARQ results, they are configured to be grouped averagely into 4 groups. After the target HARQ results included in each HARQ group are converted into corresponding binary values, a logical AND operation is performed to obtain 4 operation results, that is, to obtain 4 pre-processed HARQ results of the respective HARQ groups. Thus, a target PUCCH may be selected in accordance with Table 6 for the combined pre-processed HARQ result feedback.

TABLE 6

| Combined pre-processed HARQ results | Target resources | Pre-processed HARQ results which are represented |
|---|---|---|
| X Y (X may be 0 or 1, and Y may be 0 or 1) | n_PUCCH 1 | XY00 |
| | n_PUCCH 2 | XY01 |
| | n_PUCCH 3 | XY10 |
| | n_PUCCH 4 | XY11 |

Assuming that the plurality of pre-processed HARQ results are 0, 0, 1, and 0, the combined pre-processed HARQ result is 00, i.e., X and Y are 0 and 0 respectively, and the target resource is n_PUCCH 3.

According to the above examples, such a purpose can be achieved that the plurality of target HARQ results are represented by both the combined HARQ result and the target resource, so that the target resource can be saved and HARQ feedback efficiency in the MTC system can be improved, which facilitate power saving for the MTC device.

According to one example, in some embodiments, different implementations may be switched based on the total number of the plurality of target HARQ results. For example, if the total number of the plurality of target HARQ results is small, e.g., 1 or 2, the scheme provided in Example 1 may be adopted to perform the feedback on the plurality of target HARQ results. If the number of target HARQ results is large and especially is greater than 4, the scheme provided in Example 2 may be adopted to perform the feedback on the plurality of target HARQ results. If the number of target HARQ results is 3 or 4, the scheme provided in Example 3 may be adopted to perform the feedback on the plurality of target HARQ results. How to switch between the above different schemes should also belong to the protection scope of the present disclosure.

Corresponding to the foregoing method examples for implementing various application functions, the present disclosure also provides apparatus examples for implementing various application functions and corresponding MTC terminal examples.

Figure 16:
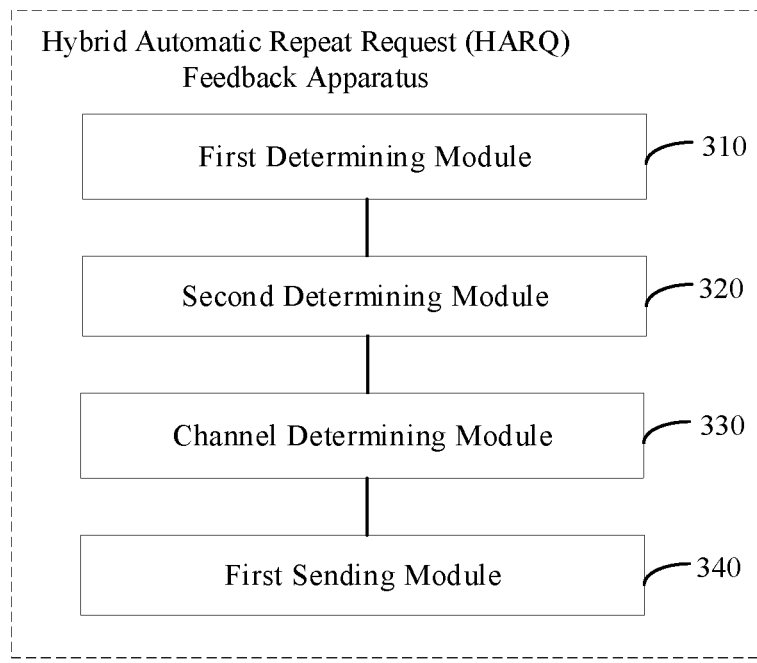
FIG. 16 is a block diagram illustrating an HARQ feedback apparatus according to an example.

Referring to FIG. 16, which is a block diagram illustrating an HARQ feedback apparatus according to an example, the apparatus is applicable to an MTC device, and includes:
a first determining module 310, configured to determine a plurality of target HARQ results; where the plurality of target HARQ results correspond to a plurality of respective target PDSCHs which are scheduled by a current PDCCH;
a second determining module 320, configured to determine a combined HARQ result based on the plurality of target HARQ results; where the combined HARQ result is configured to represent the plurality of target HARQ results;
a channel determining module 330, configured to determine one target PUCCH; where the target PUCCH includes a target resource carrying the combined HARQ result; and
a first sending module 340, configured to send the target PUCCH that includes the target resource carrying the combined HARQ result to a base station.

Figure 17:
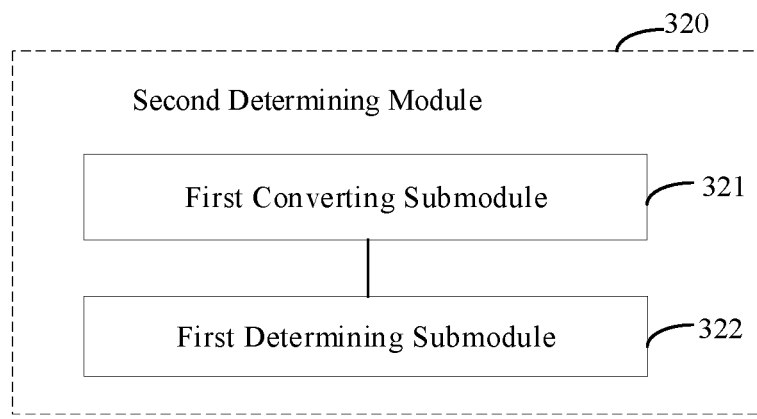
FIG. 17 is a block diagram illustrating another HARQ feedback apparatus according to an example.

Referring to FIG. 17, which is a block diagram illustrating another HARQ feedback apparatus on the basis of the example illustrated in FIG. 16, the second determining module 320 includes:
a first converting submodule 321, configured to convert the plurality of target HARQ results into respective binary values in accordance with a preset correspondence between HARQ results and binary values; and
a first determining submodule 322, configured to perform a logical AND operation on the respective binary values for the plurality of target HARQ results, and take a result of the operation as the combined HARQ result.

Figure 18:
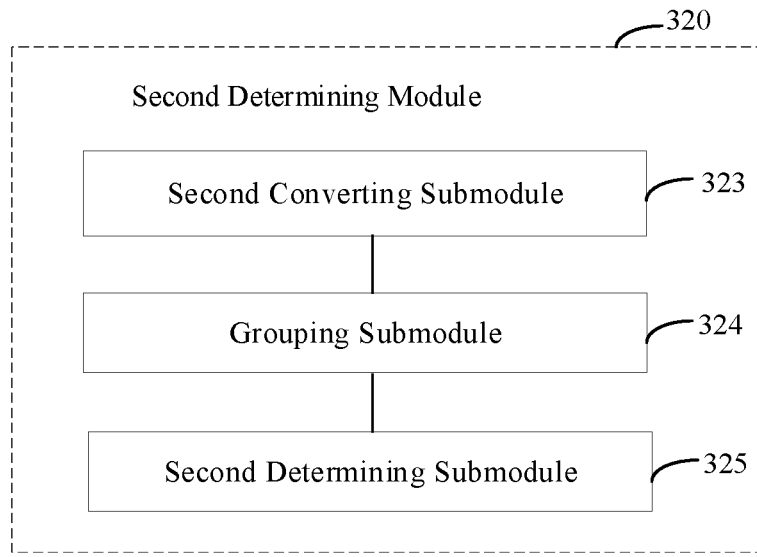
FIG. 18 is a block diagram illustrating another HARQ feedback apparatus according to an example.

Referring to FIG. 18, which is a block diagram illustrating another HARQ feedback apparatus on the basis of the example illustrated in FIG. 16, the second determining module 320 includes:
a second converting submodule 323, configured to convert the plurality of target HARQ results into respective binary values in accordance with a preset correspondence between HARQ results and binary values;
a grouping submodule 324, configured to group the plurality of target HARQ results into a plurality of HARQ groups; and
a second determining submodule 325, configured to for each of the HARQ groups, perform a logical AND operation on the respective binary values for the target HARQ results included in the HARQ group, and take a result of the operation as the combined HARQ result of the current HARQ group.

Figure 19:
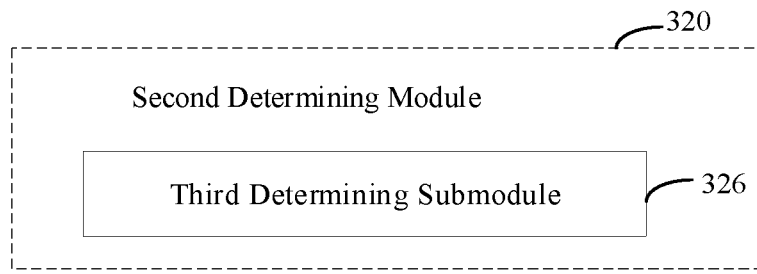
FIG. 19 is a block diagram illustrating another HARQ feedback apparatus according to an example.

Referring to FIG. 19, which is a block diagram illustrating another HARQ feedback apparatus on the basis of the example illustrated in FIG. 16, the second determining module 320 includes:
a third determining submodule 326, configured to sort the plurality of target HARQ results in sequence and perform channel coding, scrambling and modulation in turn to obtain the combined HARQ result.

Figure 20:
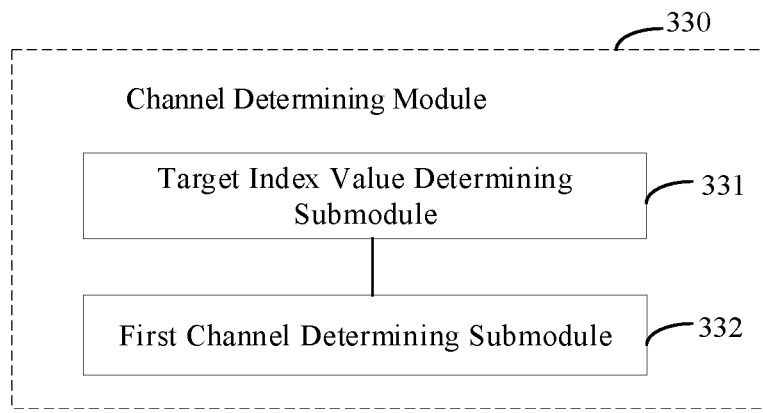
FIG. 20 is a block diagram illustrating another HARQ feedback apparatus according to an example.

Referring to FIG. 20, which is a block diagram illustrating another HARQ feedback apparatus on the basis of the example illustrated in FIG. 16, the second channel determining module 330 includes:
a target index value determining submodule 331, configured to determine a target index value of the target resource; and a first channel determining submodule 332, configured to take a PUCCH indicated by the target index value as the target PUCCH.

Figure 21:
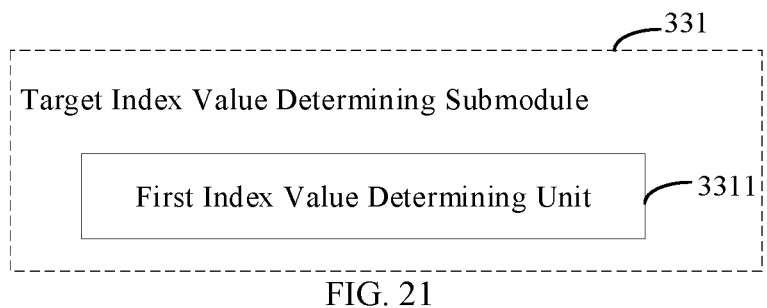
FIG. 21 is a block diagram illustrating another HARQ feedback apparatus according to an example.

Referring to FIG. 21, which is a block diagram illustrating another HARQ feedback apparatus on the basis of the example illustrated in FIG. 20, the target index value determining submodule 331 includes:

a first index value determining unit 3311, configured to determine the target index value based on a value corresponding to a target starting position, a target CCE index value of a search space, and a first target offset.

In particular, the target starting position is configured by a higher-layer signaling and indicates a starting position of a PUCCH resource carrying an HARQ result, the target CCE index value indicates a minimum CCE index value of the current PDCCH, and the first target offset is carried by the current PDCCH and indicates an offset of a PUCCH resource for HARQ result feedback.

Figure 22:
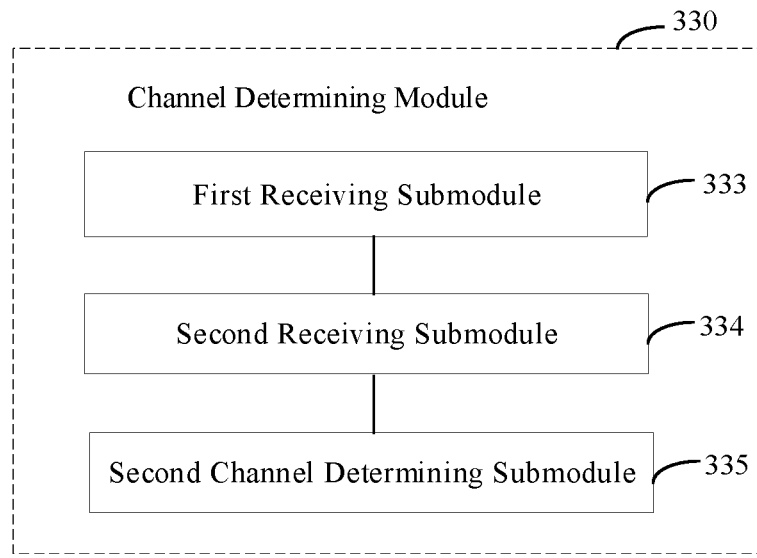
FIG. 22 is a block diagram illustrating another HARQ feedback apparatus according to an example.

Referring to FIG. 22, which is a block diagram illustrating another HARQ feedback apparatus on the basis of the example illustrated in FIG. 16, the channel determining module 330 includes:

a first receiving submodule 333, configured to receive a PUCCH set sent by the base station through a first target signaling, where the PUCCH set includes a plurality of candidate PUCCHs;

a second receiving submodule 334, configured to receive a second target signaling sent by the base station, where the second target signaling carries resource indicating information for indicating the target resource; and a second channel determining submodule 335, configured to take, based on the resource indicating information, a candidate PUCCH corresponding to the target resource from the PUCCH set as the target PUCCH.

Figure 23:
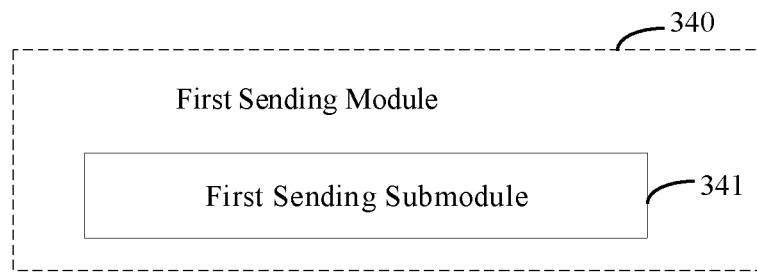
FIG. 23 is a block diagram illustrating another HARQ feedback apparatus according to an example.

Referring to FIG. 23, which is a block diagram illustrating another HARQ feedback apparatus on the basis of the example illustrated in FIG. 16, the first sending module 340 includes:

a first sending submodule 341, configured to make the combined HARQ result carried by the target resource; and send the target PUCCH to the base station in a preset PUCCH format.

Figure 24:
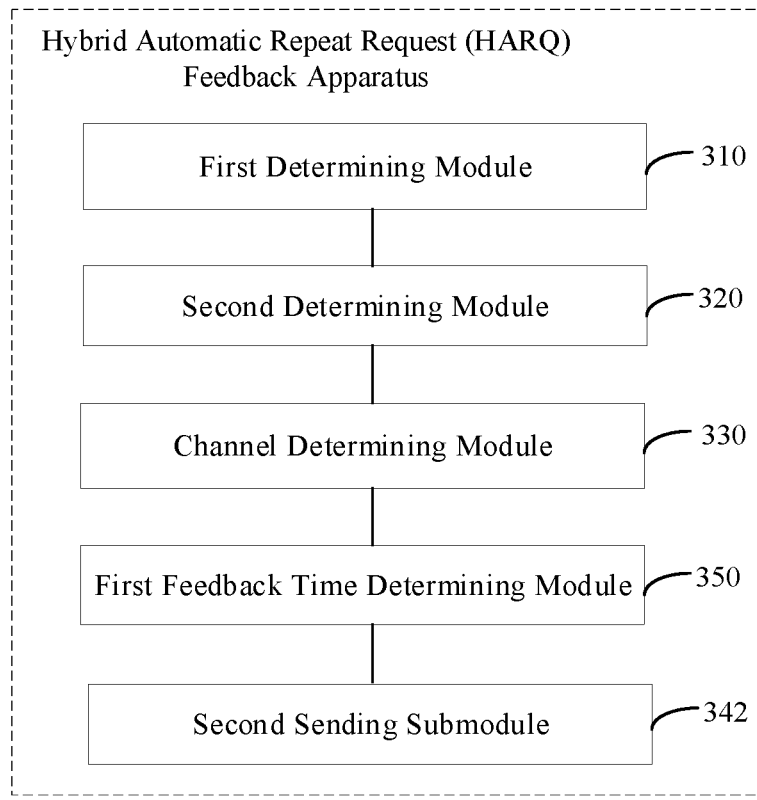
FIG. 24 is a block diagram illustrating another HARQ feedback apparatus according to an example.

Referring to FIG. 24, which is a block diagram illustrating another HARQ feedback apparatus on the basis of the example illustrated in FIG. 16, the apparatus further includes:

a first feedback time determining module 350, configured to determine a target feedback time point.

Accordingly, the first sending module 340 includes:

a second sending submodule 342, configured to send the target PUCCH that includes the target resource carrying the combined HARQ result to the base station when the target feedback time point is reached.

Figure 25:
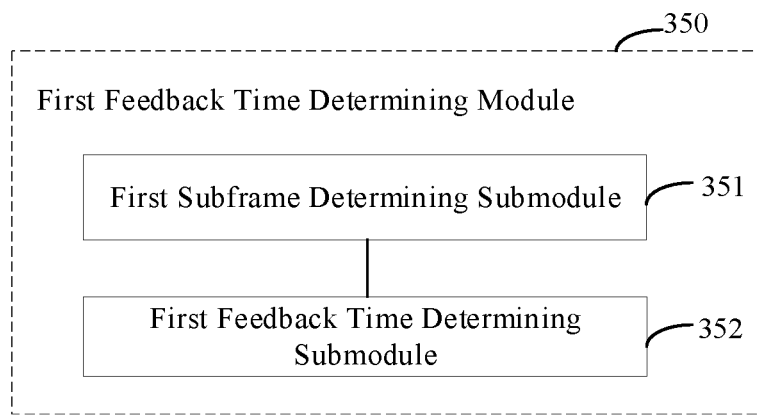
FIG. 25 is a block diagram illustrating another HARQ feedback apparatus according to an example.

Referring to FIG. 25, which is a block diagram illustrating another HARQ feedback apparatus on the basis of the example illustrated in FIG. 24, the first feedback time determining module 350 includes:

a first subframe determining submodule 351, configured to determine a target subframe; where the target subframe is a first one of valid subframes which are spaced from a candidate subframe by a preset number of subframes, and the candidate subframe is a subframe in which a last one of the plurality of PDSCHs scheduled by the current PDCCH locates; and a first feedback time determining submodule 352, configured to take a time point to send the target subframe as the target feedback time point.

Figure 26:
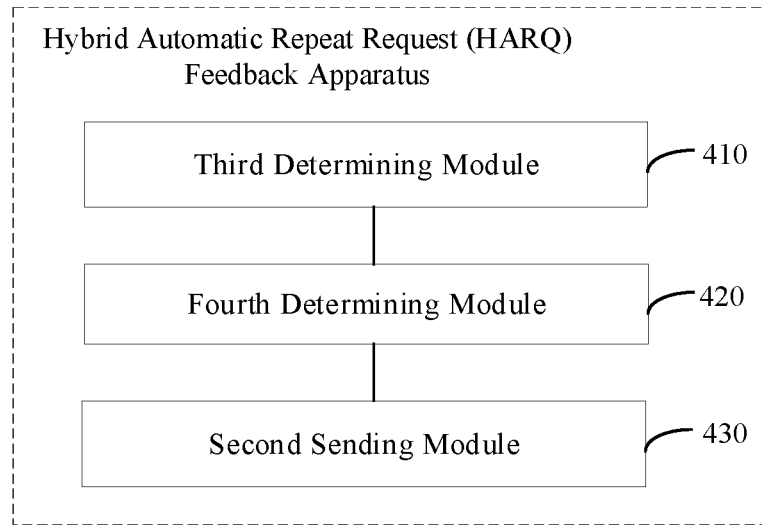
FIG. 26 is a block diagram illustrating another HARQ feedback apparatus according to an example.

Referring to FIG. 26, which is a block diagram illustrating an HARQ feedback apparatus according to an example, the apparatus is applicable to an MTC device, and includes:

a third determining module 410, configured to determine a plurality of target HARQ results; where the plurality of target HARQ results correspond to a plurality of respective target PDSCHs which are scheduled by a current PDCCH;

a fourth determining module 420, configured to determine, based on the plurality of target HARQ results, one target PUCCH from a plurality of candidate PUCCHs and a combined HARQ result; where the target PUCCH includes a target resource carrying the combined HARQ result, and the combined HARQ result and the target resource are configured to represent the plurality of target HARQ results; and a second sending module 430, configured to send the target PUCCH that includes the target resource carrying the combined HARQ result to a base station.

Figure 27:
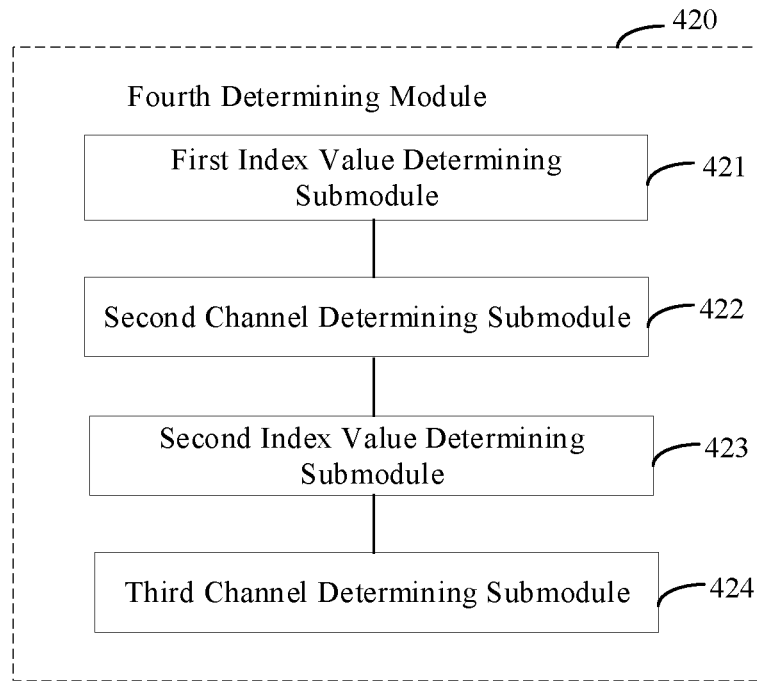
FIG. 27 is a block diagram illustrating another HARQ feedback apparatus according to an example.

Referring to FIG. 27, which is a block diagram illustrating another HARQ feedback apparatus on the basis of the example illustrated in FIG. 26, the fourth determining module 420 includes:

a first index value determining submodule 421, configured to determine a first index value, where the first index value is a resource index value of a first one of the plurality of candidate PUCCHs;

a second channel determining submodule 422, configured to take a PUCCH indicated by the first index value as the first candidate PUCCH;

a second index value determining submodule 423, configured to determine a second index value based on the first index value and a second target offset; where the second target offset is pre-configured to indicate an offset of a PUCCH resource of other candidate PUCCH, and said other candidate PUCCH is a candidate PUCCH other than the first candidate PUCCH; and a third channel determining submodule 424, configured to take a PUCCH indicated by the second index value as said other candidate PUCCH.

Figure 28:
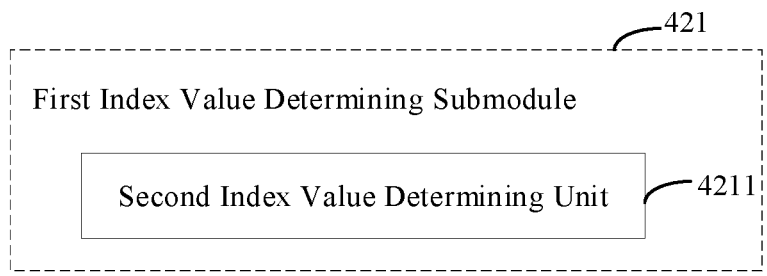
FIG. 28 is a block diagram illustrating another HARQ feedback apparatus according to an example of the present disclosure.

Referring to FIG. 28, which is a block diagram illustrating another HARQ feedback apparatus on the basis of the example illustrated in FIG. 27, the first index value determining submodule 421 includes:

a second index value determining unit 4211, configured to determine the first index value based on a value corresponding to a target starting position, a target CCE index value of a search space, and a first target offset.

In particular, the target starting position is configured by a higher-layer signaling and indicates a starting position of a PUCCH resource carrying an HARQ result, the target CCE index value indicates a minimum CCE index value of the current PDCCH, and the first target offset is carried by the current PDCCH and indicates an offset of a PUCCH resource for HARQ result feedback.

Figure 29:
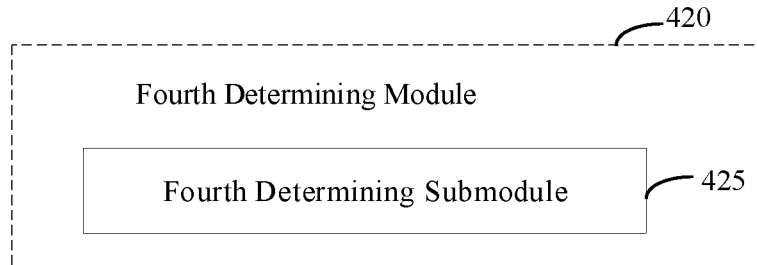
FIG. 29 is a block diagram illustrating another HARQ feedback apparatus according to an example of the present disclosure.

Referring to FIG. 29, which is a block diagram illustrating another HARQ feedback apparatus on the basis of the example illustrated in FIG. 26, the fourth determining module 420 includes:

a fourth determining submodule 425, configured to determine the one target PUCCH from the plurality of candidate PUCCHs and the combined HARQ result based on a preset mapping relationship among target HARQ results, target resources and combined HARQ results.

Figure 30:
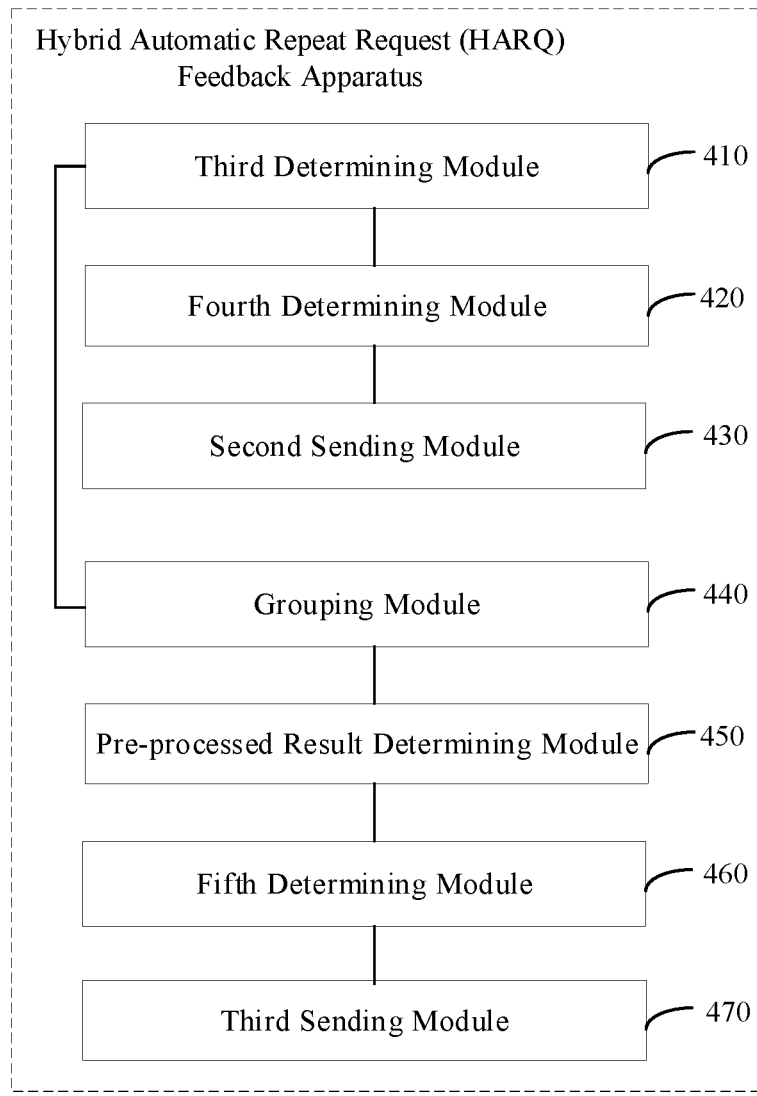
FIG. 30 is a block diagram illustrating another HARQ feedback apparatus according to an example of the present disclosure.

Referring to FIG. 30, which is a block diagram illustrating another HARQ feedback apparatus on the basis of the example illustrated in FIG. 26, the apparatus further includes:

- a grouping module 440, configured to group the plurality of target HARQ results into a plurality of HARQ groups if a total number of the plurality of target HARQ results is greater than a preset number;
- a pre-processed result determining module 450, configured to for each of the HARQ groups, determine a pre-processed HARQ result of the HARQ group based on all the target HARQ results included in the HARQ group;
- a fifth determining module 460, configured to determine, based on a plurality of pre-processed HARQ results, one target PUCCH from the plurality of candidate PUCCHs and a combined pre-processed HARQ result; where the target PUCCH includes the target resource carrying the combined pre-processed HARQ result, and the combined pre-processed HARQ result and the target resource are configured to represent the plurality of pre-processed HARQ results; and
- a third sending module 470, configured to send the target PUCCH that includes the target resource carrying the combined pre-processed HARQ result to the base station.

Figure 31:
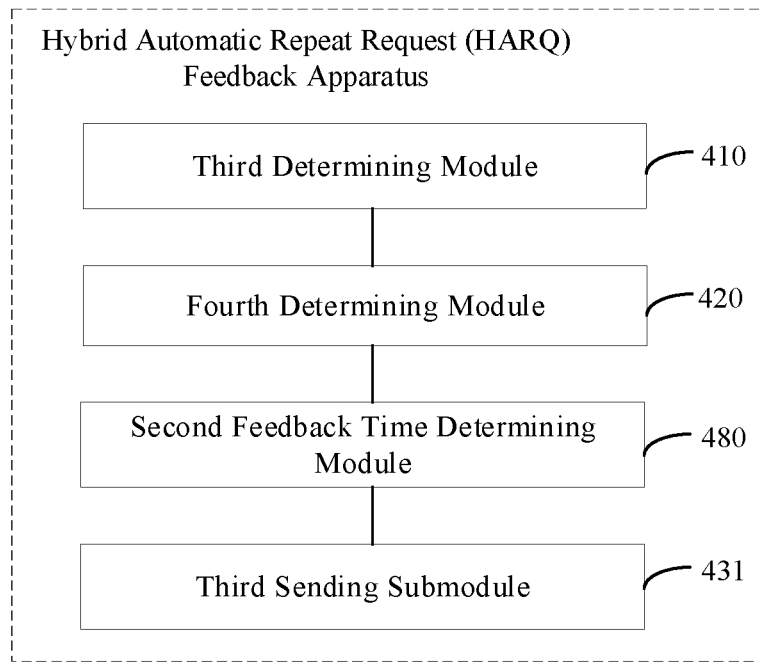
FIG. 31 is a block diagram illustrating another HARQ feedback apparatus according to an example of the present disclosure.

Referring to FIG. 31, which is a block diagram illustrating another HARQ feedback apparatus on the basis of the example illustrated in FIG. 26, the apparatus further includes:

- a second feedback time determining module 480, configured to determine a target feedback time point.

Accordingly, the second sending module 430 includes:

- a third sending submodule 431, configured to send the target PUCCH that includes the target resource carrying the combined HARQ result to the base station when the target feedback time point is reached.

Figure 32:
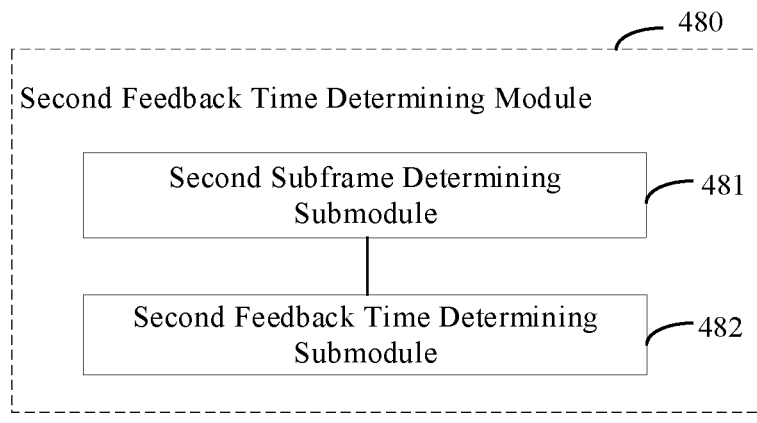
FIG. 32 is a block diagram illustrating another HARQ feedback apparatus according to an example of the present disclosure.

Referring to FIG. 32, which is a block diagram illustrating another HARQ feedback apparatus on the basis of the example illustrated in FIG. 31, the second feedback time determining module 480 includes:

- a second subframe determining submodule 481, configured to determine a target subframe; where the target subframe is a first one of valid subframes which are spaced from a candidate subframe by a preset number of subframes, and the candidate subframe is a subframe in which a last one of the plurality of PDSCHs scheduled by the current PDCCH locates; and
- a second feedback time determining submodule 482, configured to take a time point to send the target subframe as the target feedback time point.

Since the apparatus examples essentially correspond to the method examples, reference may be made to the description of related parts of the method examples. The apparatus examples described above are merely illustrative, where the units described as separate components may or may not be physically separated, and the components displayed as units may or may not be physical units, that is, may be located in one place or distributed to multiple units in a network. Some or all of the modules may be selected according to actual needs to achieve the objectives of the present disclosure. It can be understood and implemented by those of ordinary skill in the art without any creative effort.

Accordingly, the present disclosure also provides a computer-readable storage medium storing a computer program for performing any one of the HARQ feedback methods described above.

Accordingly, the present disclosure also provides an HARQ feedback apparatus, which is applicable to an MTC device and includes:

a processor; and memory for storing instructions executable by the processor.

The processor is configured to:

determine a plurality of target HARQ results; where the plurality of target HARQ results correspond to a plurality of respective target PDSCHs which are scheduled by a current PDCCH;

determine a combined HARQ result based on the plurality of target HARQ results; where the combined HARQ result is configured to represent the plurality of target HARQ results;

determine one target PUCCH; where the target PUCCH includes a target resource carrying the combined HARQ result; and send the target PUCCH that includes the target resource carrying the combined HARQ result to a base station.

Accordingly, the present disclosure also provides an HARQ feedback apparatus, which is applicable to an MTC device and includes:

a processor; and memory for storing instructions executable by the processor.

The processor is configured to:

determine a plurality of target HARQ results; where the plurality of target HARQ results correspond to a plurality of respective target PDSCHs which are scheduled by a current PDCCH; determine, based on the plurality of target HARQ results, one target PUCCH from a plurality of candidate PUCCHs and a combined HARQ result; where the target PUCCH includes a target resource carrying the combined HARQ result, and the combined HARQ result and the target resource are configured to represent the plurality of target HARQ results; and, send the target PUCCH that includes the target resource carrying the combined HARQ result to a base station.

Figure 33:
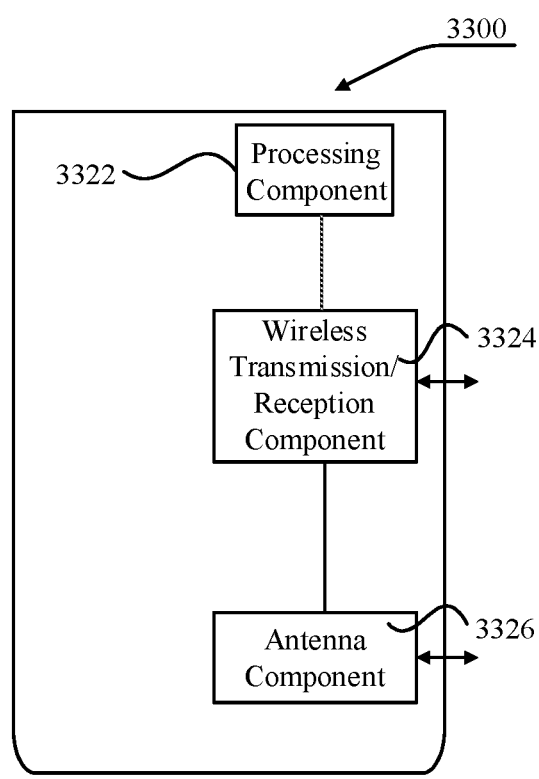
FIG. 33 is a structural schematic diagram applicable to HARQ feedback device illustrated according to an example of the present disclosure.

As illustrated in FIG. 33, FIG. 33 is a schematic structural diagram illustrating an HARQ feedback device 3300 according to an example. The device 3300 may be provided as an MTC device. As illustrated in FIG. 33, the device 3300 includes a processing component 3322, a wireless transmission/reception component 3324, an antenna component 3326, and a signal processing part peculiar to the wireless interface. The processing component 3322 may further include one or more processors.

One of the processors in the processing component 3322 may be configured to perform any one of the HARQ feedback methods applicable to the MTC device described above.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above described accurate structures illustrated in the drawings, and various modifications and changes can be made to the present disclosure without departing from the scope thereof. The scope of the present disclosure is to be limited only by the appended claims.

What is claimed is:

1. A hybrid automatic repeat request (HARQ) feedback method, being applicable to a Machine Type Communication (MTC) device, comprising:
   determining a plurality of target HARQ results; wherein the plurality of target HARQ results correspond to a plurality of respective target physical downlink shared channels (PDSCHs) which are scheduled by a current physical downlink control channel (PDCCH);
   determining a combined HARQ result based on the plurality of target HARQ results; wherein the combined HARQ result is configured to represent the plurality of target HARQ results;
   determining one target physical uplink control channel (PUCCH); wherein the target PUCCH comprises a target resource carrying the combined HARQ result; and
   sending the target PUCCH that comprises the target resource carrying the combined HARQ result to a base station.

2. The method according to claim 1, wherein the determining the combined HARQ result based on the plurality of target HARQ results comprises:
   converting the plurality of target HARQ results into respective binary values in accordance with a preset correspondence between HARQ results and binary values;
   performing a logical AND operation on the respective binary values for the plurality of target HARQ results; and
   taking a result of the operation as the combined HARQ result.

3. The method according to claim 1, wherein the determining the combined HARQ result based on the plurality of target HARQ results comprises:
   converting the plurality of target HARQ results into respective binary values in accordance with a preset correspondence between HARQ results and binary values;
   grouping the plurality of target HARQ results into a plurality of HARQ groups;
   for an HARQ group,
   performing a logical AND operation on the respective binary values for the target HARQ results comprised in the HARQ group; and
   taking a result of the operation as the combined HARQ result of the current HARQ group.

4. The method according to claim 1, wherein the determining the combined HARQ result based on the plurality of target HARQ results comprises:
   sorting the plurality of target HARQ results in sequence; and
   performing channel coding, scrambling and modulation in turn to obtain the combined HARQ result.

5. The method according to claim 1, wherein the determining the one PUCCH comprises:
   determining a target index value of the target resource; and
   taking a PUCCH indicated by the target index value as the target PUCCH.

6. The method according to claim 5, wherein the determining the target index value of the target resource comprises:
   determining the target index value based on a value corresponding to a target starting position, a target control channel element (CCE) index value of a search space, and a first target offset;
   wherein the target starting position is configured by a higher-layer signaling and indicates a starting position of a PUCCH resource carrying an HARQ result,
   the target CCE index value indicates a minimum CCE index value of the current PDCCH, and
   the first target offset is carried by the current PDCCH and indicates an offset of a PUCCH resource for HARQ result feedback.

7. The method according to claim 1, wherein the determining the one PUCCH comprises:
   receiving a PUCCH set sent by the base station through a first target signaling, wherein the PUCCH set comprises a plurality of candidate PUCCHs;
   receiving a second target signaling sent by the base station, wherein the second target signaling carries resource indicating information for indicating the target resource; and
   taking, based on the resource indicating information, a candidate PUCCH corresponding to the target resource from the PUCCH set as the target PUCCH.

8. The method according to claim 1, wherein the sending the target PUCCH that comprises the target resource carrying the combined HARQ result to the base station comprises:
   making the combined HARQ result carried by the target resource; and
   sending the target PUCCH to the base station in a preset PUCCH format.

9. The method according to claim 1,
   wherein the method further comprises:
   determining a target feedback time point; and
   wherein the sending the target PUCCH that comprises the target resource carrying the combined HARQ result to the base station comprises:
   in response to reaching the target feedback time point, sending the target PUCCH that comprises the target resource carrying the combined HARQ result to the base station.

10. The method according to claim 9, wherein the determining the target feedback time point comprises:
    determining a target subframe; wherein the target subframe is a first one of valid subframes which are spaced from a candidate subframe by a preset number of subframes, and the candidate subframe is a subframe in which a last one of the plurality of PDSCHs scheduled by the current PDCCH locates; and
    taking a time point to send the target subframe as the target feedback time point.

11. A communication system implementing the HARQ feedback method according to claim 1, comprising the MTC device, wherein the plurality of target HARQ results are determined first so as to be represented by the one combined HARQ result, thereby improving HARQ feedback efficiency in the communication system and reducing cost of PUCCH resource, and facilitating power saving for the MTC device.

12. A hybrid automatic repeat request (HARQ) feedback method, being applicable to a Machine Type Communication (MTC) device, comprising:
    determining a plurality of target HARQ results; wherein the plurality of target HARQ results correspond to a plurality of respective target physical downlink shared channels (PDSCHs) which are scheduled by a current physical downlink control channel (PDCCH);

determining, based on the plurality of target HARQ results, one target physical uplink control channel (PUCCH) from a plurality of candidate PUCCHs and a combined HARQ result; wherein the target PUCCH comprises a target resource carrying the combined HARQ result, and the combined HARQ result and the target resource are configured to represent the plurality of target HARQ results; and sending the target PUCCH that comprises the target resource carrying the combined HARQ result to a base station.

13. The method according to claim 12, wherein the plurality of candidate PUCCHs are determined by:
determining a first index value, wherein the first index value is a resource index value of a first one of the plurality of candidate PUCCHs;
taking a PUCCH indicated by the first index value as the first candidate PUCCH;
determining a second index value based on the first index value and a second target offset; wherein the second target offset is pre-configured to indicate an offset of a PUCCH resource of other candidate PUCCH, and said other candidate PUCCH is a candidate PUCCH other than the first candidate PUCCH; and
taking a PUCCH indicated by the second index value as said other candidate PUCCH.

14. The method according to claim 13, wherein the determining the first index value comprises:
determining the first index value based on a value corresponding to a target starting position, a target control channel element (CCE) index value of a search space, and a first target offset;
wherein the target starting position is configured by a higher-layer signaling and indicates a starting position of a PUCCH resource carrying an HARQ result,
the target CCE index value indicates a minimum CCE index value of the current PDCCH, and
the first target offset is carried by the current PDCCH and indicates an offset of a PUCCH resource for HARQ result feedback.

15. The method according to claim 12, wherein the determining, based on the plurality of target HARQ results, the one target PUCCH from the plurality of candidate PUCCHs and the combined HARQ result comprises:
determining, based on a preset mapping relationship among target HARQ results, target resources and combined HARQ results, the one target PUCCH from the plurality of candidate PUCCHs and the combined HARQ result.

16. The method according to claim 12, further comprising:
in response to that a total number of the plurality of target HARQ results is greater than a preset number, grouping the plurality of target HARQ results into a plurality of HARQ groups;
for an HARQ group, determining a pre-processed HARQ result of the HARQ group based on all the target HARQ results comprised in the HARQ group;
determining, based on a plurality of pre-processed HARQ results, one target PUCCH from the plurality of candidate PUCCHs and a combined pre-processed HARQ result; wherein the target PUCCH comprises the target resource carrying the combined pre-processed HARQ result, and the combined pre-processed HARQ result and the target resource are configured to represent the plurality of pre-processed HARQ results; and
sending the target PUCCH that comprises the target resource carrying the combined pre-processed HARQ result to the base station.

17. The method according to claim 12,
wherein the method further comprises:
determining a target feedback time point; and
wherein the sending the target PUCCH that comprises the target resource carrying the combined HARQ result to the base station comprises:
in response to reaching the target feedback time point, sending the target PUCCH that comprises the target resource carrying the combined HARQ result to the base station.

18. The method according to claim 17, wherein the determining the target feedback time point comprises:
determining a target subframe; wherein the target subframe is a first one of valid subframes which are spaced from a candidate subframe by a preset number of subframes, and the candidate subframe is a subframe in which a last one of the plurality of PDSCHs scheduled by the current PDCCH locates; and
taking a time point to send the target subframe as the target feedback time point.

19. A hybrid automatic repeat request (HARQ) feedback apparatus implementing the HARQ feedback method according to claim 12, comprising:
a processor; and
memory for storing instructions executable by the processor;
wherein the processor is configured to
implement steps of the method.

20. A hybrid automatic repeat request (HARQ) feedback apparatus, being applicable to a Machine Type Communication (MTC) device, comprising:
a processor; and
memory for storing instructions executable by the processor;
wherein the processor is configured to:
determine a plurality of target HARQ results; wherein the plurality of target HARQ results correspond to a plurality of respective target physical downlink shared channels (PDSCHs) which are scheduled by a current physical downlink control channel (PDCCH);
determine a combined HARQ result based on the plurality of target HARQ results; wherein the combined HARQ result is configured to represent the plurality of target HARQ results;
determine one target physical uplink control channel (PUCCH); wherein the target PUCCH comprises a target resource carrying the combined HARQ result; and
send the target PUCCH that comprises the target resource carrying the combined HARQ result to a base station.

* * * * *